(12) United States Patent
Ohtani

(10) Patent No.: US 7,324,189 B2
(45) Date of Patent: Jan. 29, 2008

(54) LIGHT POWER ADJUSTING METHOD, OPTICAL TRANSMITTER, AND OPTICAL RECEIVER

(75) Inventor: Toshihiro Ohtani, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/277,559

(22) Filed: Mar. 27, 2006

(65) Prior Publication Data
US 2007/0139774 A1    Jun. 21, 2007

(30) Foreign Application Priority Data
Dec. 19, 2005    (JP) .............................. 2005-365246

(51) Int. Cl.
*G01N 21/00* (2006.01)
(52) U.S. Cl. .................................... 356/73.1
(58) Field of Classification Search ............... None
See application file for complete search history.

(56) References Cited
U.S. PATENT DOCUMENTS
5,767,956 A    6/1998  Yoshida 6,599,039 B1*   7/2003  Nakazato ................. 398/25
6,839,516 B2*   1/2005  Lee et al. ................. 398/15

OTHER PUBLICATIONS
"Patent Abstracts of Japan," Japanese Patent Publication No. 10-200483, Publication Date: Jul. 31, 1998, Inventor: Sato Hideaki. (Abstract Only).

* cited by examiner

*Primary Examiner*—Tu T Nguyen
(74) *Attorney, Agent, or Firm*—Staas & Halsey LLP

(57) ABSTRACT

The present invention provides provide a light power adjusting method, an optical transmitter, and an optical receiver suitable for ensuring high data transmission quality by preventing the rapid increase in SBS which occurs when the light power exceeds a predetermined value.

The incident light power with which the SBS-induced backward propagating light included in the reflected light returned from the optical transmission line rapidly increases, i.e., the light power threshold is calculated.

By setting the power of the light incident on the optical transmission line at a value equal to or smaller than the thus calculated light power threshold, the rapid increase in the SBS-induced backward propagating light, which is a non-linear phenomenon of the optical fiber, is prevented.

15 Claims, 15 Drawing Sheets

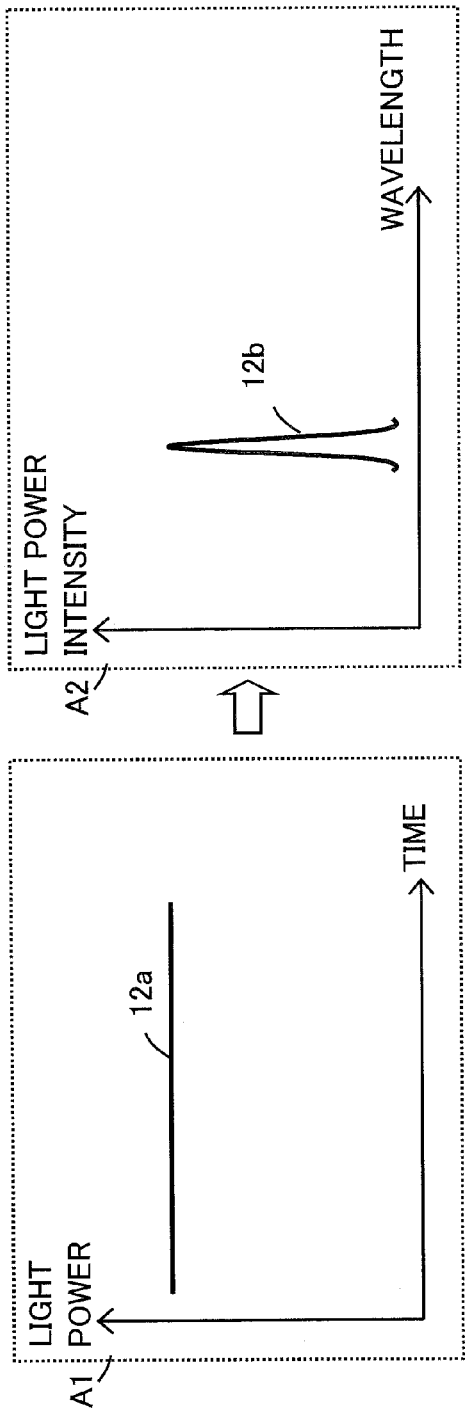
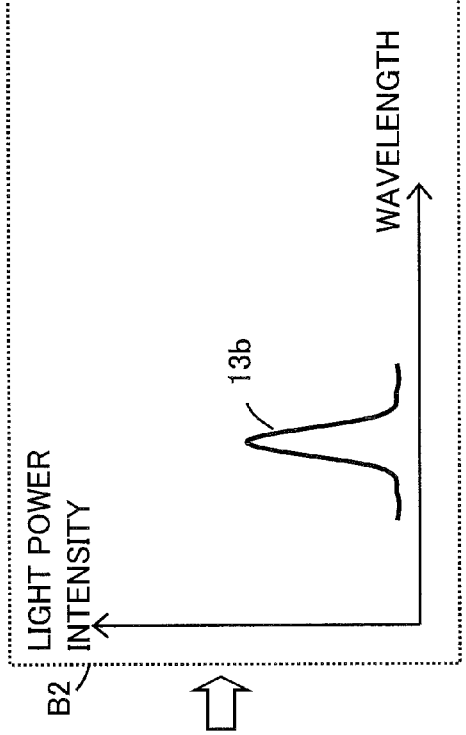
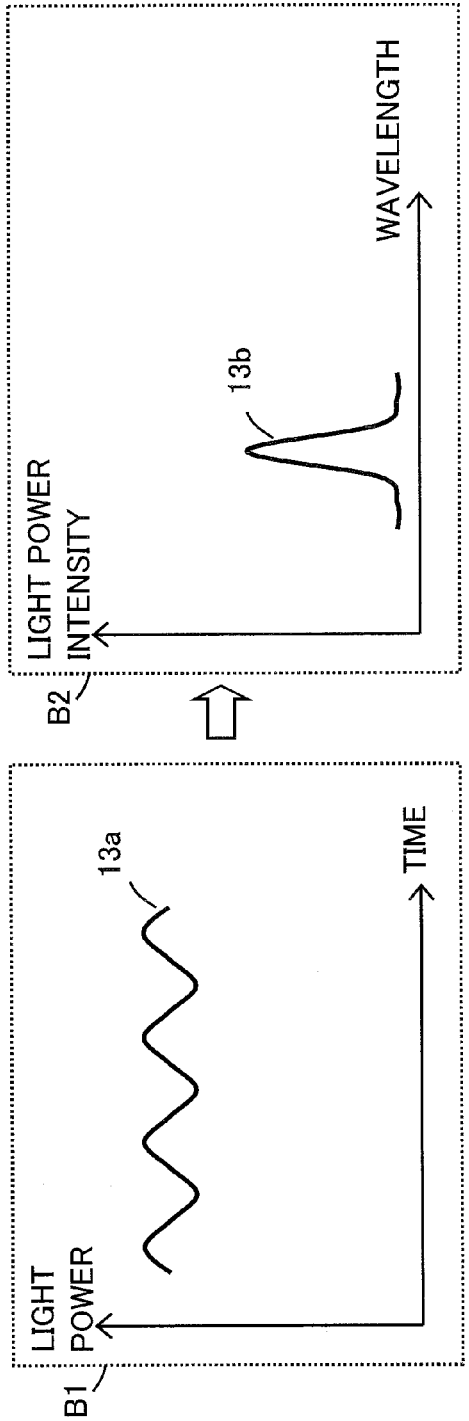

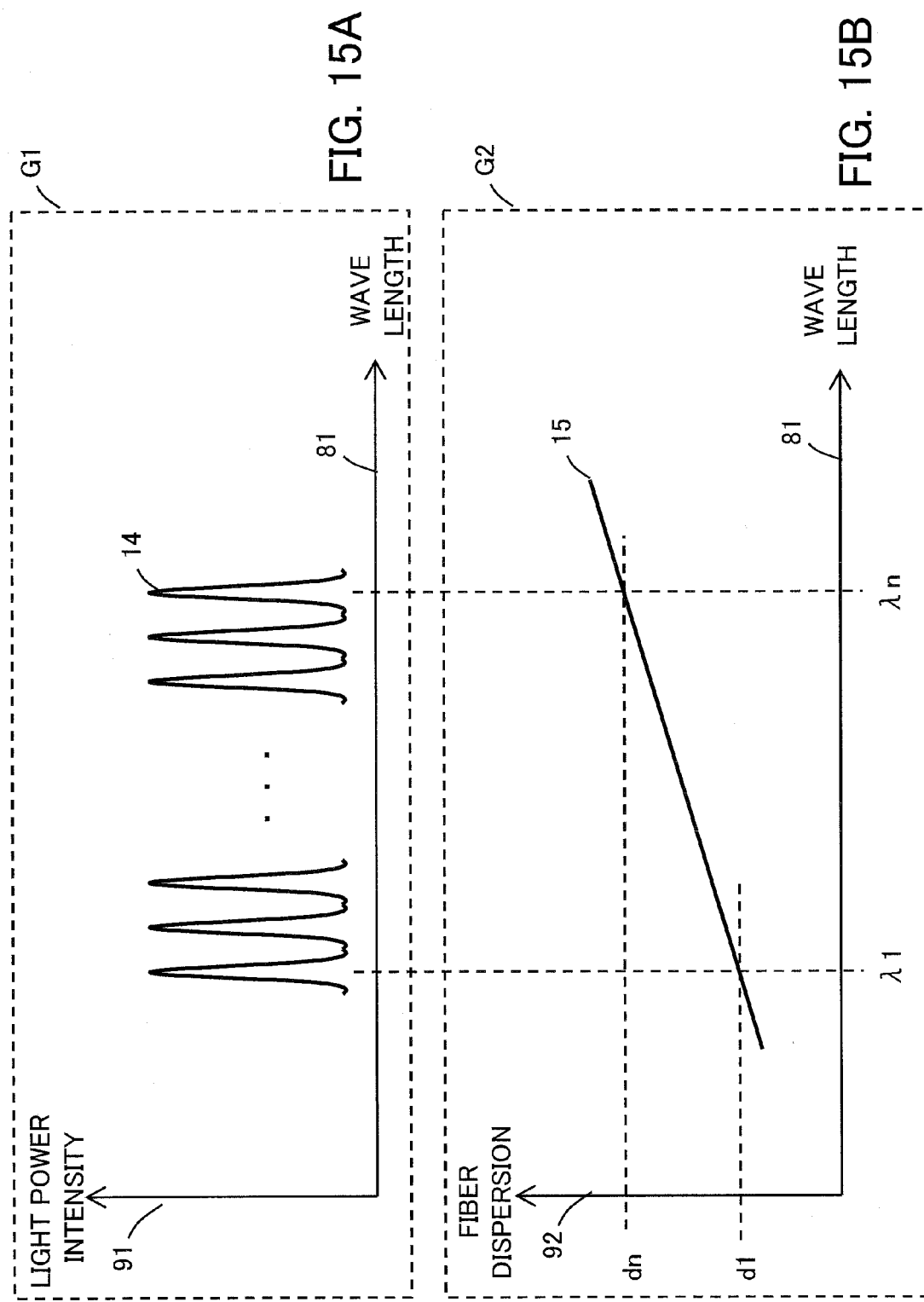

LIGHT POWER ADJUSTING METHOD, OPTICAL TRANSMITTER, AND OPTICAL RECEIVER

BACKGROUND OF THE INVENTION

1. Field of the Invention

The present invention relates to a technique of adjusting light power incident on an optical transmission line, and more particularly to a light power adjusting method, an optical transmitter, and an optical receiver suitable for ensuring high data transmission quality by preventing a rapid increase in SBS (Stimulated Brillouin Scattering) which occurs when the light power exceeds a predetermined value.

2. Description of the Related Art

An SMF (Single Mode Fiber), which is one of optical fibers forming an optical transmission line, is divided into such types as SSMF (Standard SMF), DSF (Dispersion Shifted Fiber), NZ-DSF (Nonzero DSF), and so forth, depending on differences in a chromatic dispersion coefficient and an effective cross section area Aeff of a core.

The optical fiber type is closely related to the power of the light incident on the optical fiber. Therefore, even if a certain incident light power does not cause any problem to one type of optical fiber, the incident light power may cause a rapid increase in a nonlinear phenomenon SBS to another type of optical fiber, and thus may cause serious deterioration of the data transmission quality. A value of the incident light power at which SBS rapidly increases is referred to as a light power threshold of the rapid SBS increase.

FIG. 1 illustrates an overview of occurrence of SBS.

SBS occurs as a result of interaction between light and acoustic waves (i.e., phonon) occurring in glass forming an optical fiber. Further, SBS is a nonlinear scattering phenomenon, and the occurrence rate of SBS rapidly increases when the power of light incident on the optical fiber exceeds a predetermined value. As illustrated in FIG. 1, when SBS occurs, SBS-induced backward propagating light 23 is generated in a direction opposite to a direction of incident light 10 output by an optical transmitter 100 to an optical transmission line 300a. Thus, the incident light 10 incident on the optical transmission line 300a reaches an optical receiver 200, with a part of the incident light 10 lost as the SBS-induced backward propagating light 23. Therefore, when the SBS-induced backward propagating light 23 rapidly increases, the rate of errors in data reception by the optical receiver 200 increases. As a result, the data transmission quality is deteriorated.

The occurrence rate of SBS varies depending on the Aeff value of the optical fiber and a power level of the light incident on the optical fiber. The occurrence of the SBS phenomenon can be suppressed by reducing the power of the incident light 10 or by applying a low-frequency amplitude modulation to the incident light 10 and thus decreasing energy density per wavelength. Further, the light power threshold of the rapid SBS increase varies depending on the Aeff value of the optical fiber, which depends on the optical fiber type. That is, if the optical fiber type is previously known, and if the incident light 10 is set to have an optimal light power smaller than the light power threshold of the rapid SBS increase for the optical fiber type, the increase in the SBS reflected light (i.e., the SBS-induced backward propagating light 23) can be suppressed. Accordingly, high data transmission quality can be ensured.

In a known technique, an operator of an optical transmission system is inquired to as to the optical fiber type he uses, and the output level of the optical transmitter is set on the basis of the information of the optical fiber type. This technique, however, involves extra trouble to confirm with the operator, and the information may not always be obtained.

In another known technique, the optical fiber type is estimated by measuring the power of the SBS-induced backward propagating light 23 returned from the optical transmission line 300a when the optical transmitter 100 is started. Then, the output power of the light output by the optical transmitter 100 to the optical transmission line 300a is automatically set.

FIG. 2 illustrates an example configuration in which reflected light 20 is measured by the optical transmitter 100. The reflected light 20 returned from the optical transmission line 300a is received by a reflected light measuring unit 130 via an optical coupler 101, and then the light power of the reflected light 20 is measured.

In this example, the optical fiber type is determined on the basis of the absolute value of the weak light power of the reflected light 20 returned from the optical transmission line 300a. However, the reflected light 20 returned from the optical fiber includes Fresnel reflected light 22, Rayleigh scattering light 21, and the like, in addition to the SBS-induced backward propagating light 23. Due to influences of such light, therefore, it is difficult to obtain an accurate light power value of the SBS-induced backward propagating light 23. As a result, it is highly possible to erroneously recognize the optical fiber type.

That is, the reflected light 20 returned from the optical transmission line 300a mainly includes the Rayleigh scattering light 21, the Fresnel reflected light 22, and the SBS-induced backward propagating light 23. Thus, the measured power of the reflected light 20 is equal to the absolute value of the sum of the light powers of the Rayleigh scattering light 21, the Fresnel reflected light 22, and the SBS-induced backward propagating light 23. Therefore, the light power value of only the SBS-induced backward propagating light 23 cannot be accurately calculated. Thus, it is also difficult to accurately identify the type of the optical fiber forming the optical transmission line 300a. If the optical fiber type is thus erroneously identified, and if the power of the output light output by the optical transmitter 100 is inappropriately set (i.e., set at a value larger than the threshold of the rapid SBS increase), the inappropriate light power may cause the rapid increase in SBS in the optical transmission line 300a. As a result, the data transmission quality may be seriously deteriorated.

As a technique of detecting and preventing the rapid increase in SBS, Japanese Unexamined Patent Application Publication No. 9-33389 (pages 3-4 and FIG. 7) describes a technique of detecting deterioration of an optical fiber by detecting scattering light caused by SBS. Further, Japanese Unexamined Patent Application Publication No. 10-200483 (pages 3-4 and FIGS. 1 and 3) describes a technique of preventing the rapid increase in SBS by adjusting the amount of a frequency modulation applied to a light signal.

SUMMARY OF THE INVENTION

In the known art, the optical fiber type is estimated by measuring the absolute value of the power of the reflected light returned from the optical transmission line. However, it is difficult to accurately calculate the light power of only the SBS-induced backward propagating light due to the influences of the Fresnel reflected light, the Rayleigh scattering light, and the like included in the reflected light. It is thus difficult to accurately identify the optical fiber type. Therefore, in some cases, the incident light power is set at a value exceeding the light power threshold of the SBS rapid increase, which is determined by the optical fiber type. As a result, the SBS-induced backward propagating light is generated by a large amount. This occurrence of the SBS-induced backward propagating light of a large amount forms a factor of the deterioration of the data transmission quality.

It is therefore an object of the present invention to provide a light power adjusting method, an optical transmitter, and an optical receiver suitable for ensuring high data transmission quality by preventing the rapid increase in SBS which occurs when the light power exceeds a predetermined value.

Therefore, a light power adjusting method according to one aspect of the present invention includes: measuring light power of reflected light returned from the optical transmission line with respect to light incident on the optical transmission line at first light power, measuring light power of reflected light returned from the optical transmission line with respect to light incident on the optical transmission line at second light power, the second light power being larger than the first light power at a predetermined increment, calculating a first difference between the measured values of light power of the reflected light corresponding to the light incident on the optical transmission line at the first light power and at the second light power, determining a light power threshold to be the first light power with which an amount of change of the first difference reaches a predetermined value, and setting light power of light incident on the optical transmission line at a value equal to or smaller than the light power threshold.

Accordingly, the incident light power with which the SBS-induced backward propagating light included in the reflected light returned from the optical transmission line rapidly increases, i.e., the light power threshold can be calculated. If the power of the light incident on the optical transmission line is set at a value equal to or smaller than the thus calculated light power threshold, the rapid increase in the SBS-induced backward propagating light, which is a nonlinear phenomenon of the optical fiber, can be prevented. Accordingly, high data transmission quality can be ensured.

BRIEF DESCRIPTION OF THE DRAWINGS

FIGS. 8A to 8D illustrate an overview of influence of a low-frequency amplitude modulation applied to light.

FIGS. 15A and 15B are graphs illustrating the concept of a dispersion slope.

DETAILED DESCRIPTION OF THE INVENTION

Figure 3:
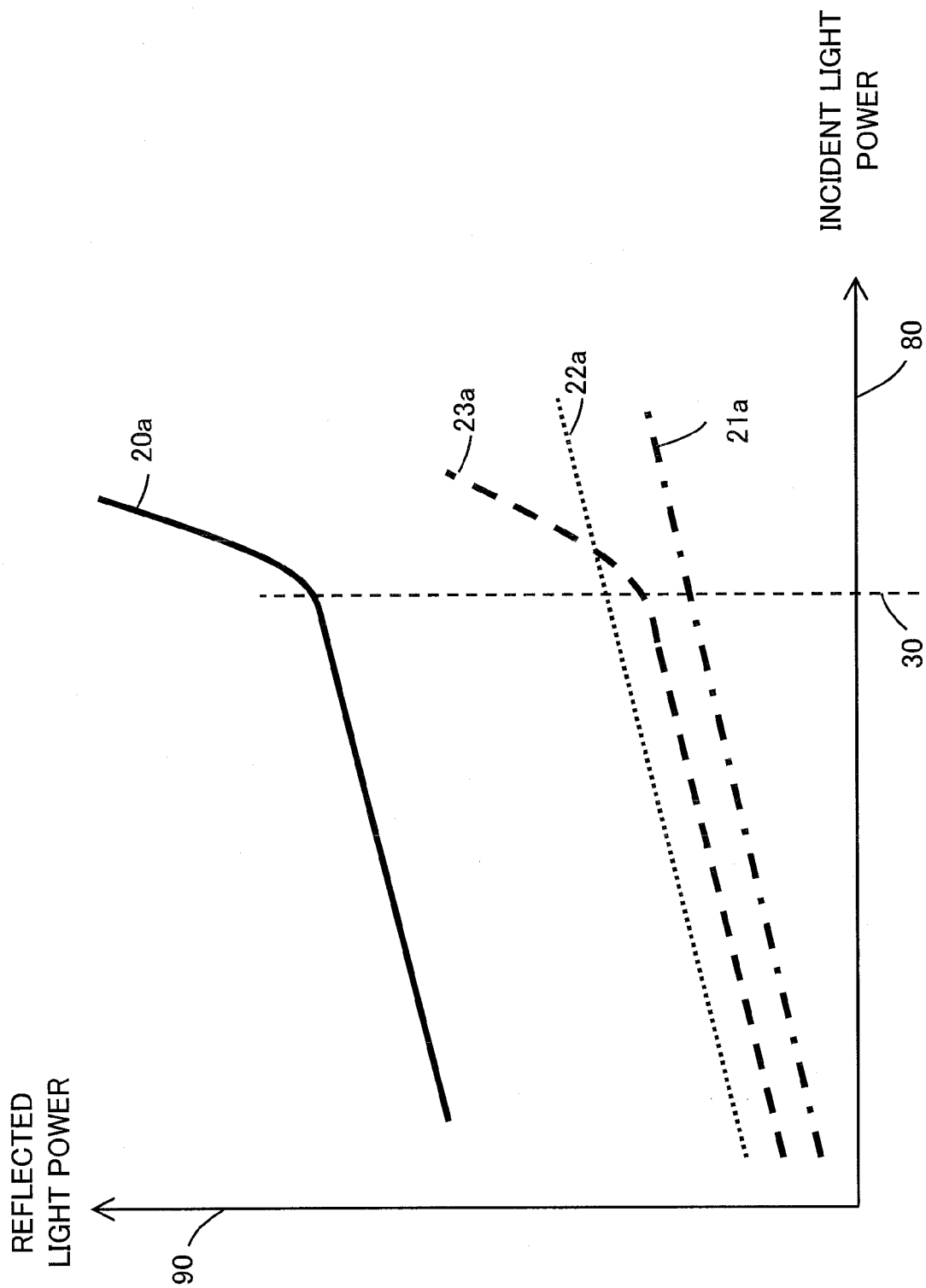
FIG. 3 illustrates a relationship between the power of incident light incident on an optical transmission line and the power of reflected light returned from the optical transmission line.

FIG. 3 illustrates a relationship between the power of incident light incident on an optical transmission line and the power of reflected light returned from the optical transmission line.

A horizontal axis 80 represents the incident light power, while a vertical axis 90 represents the reflected light power.

Figure 1:
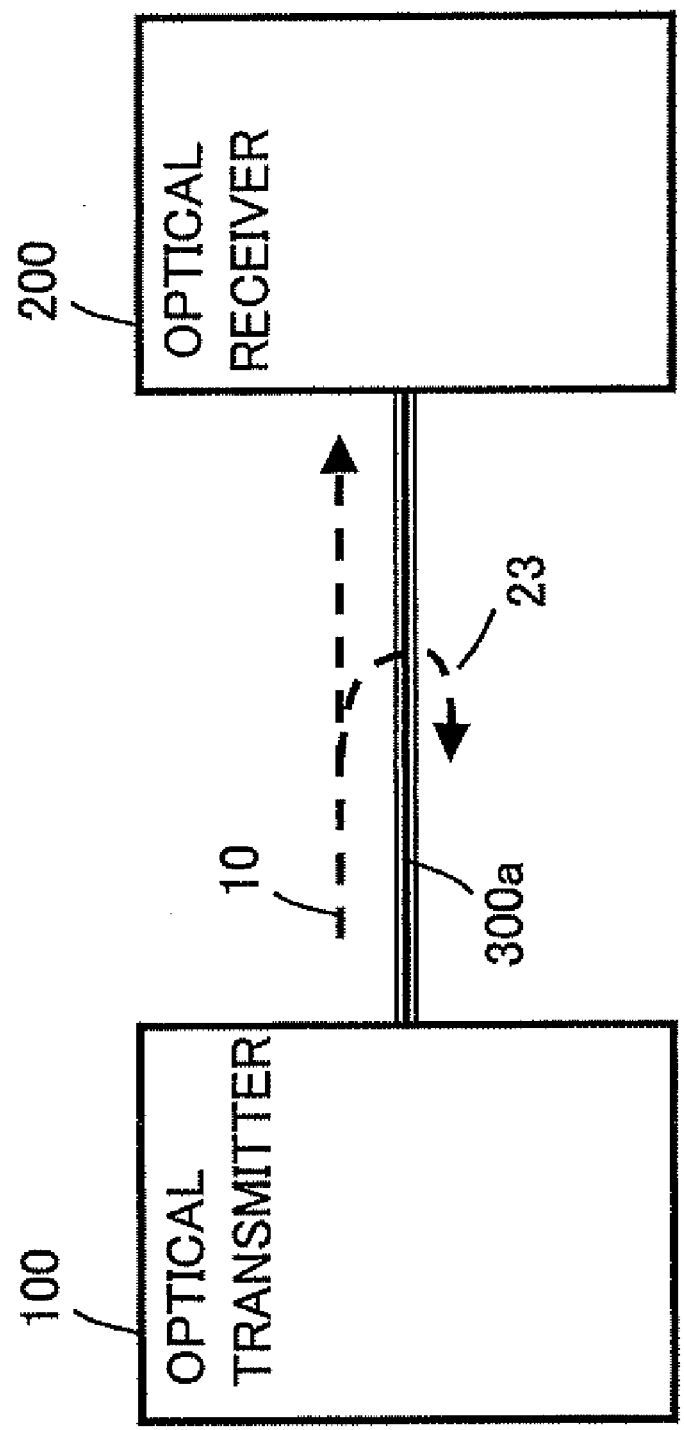
FIG. 1 illustrates an overview of occurrence of SBS.
Figure 2:
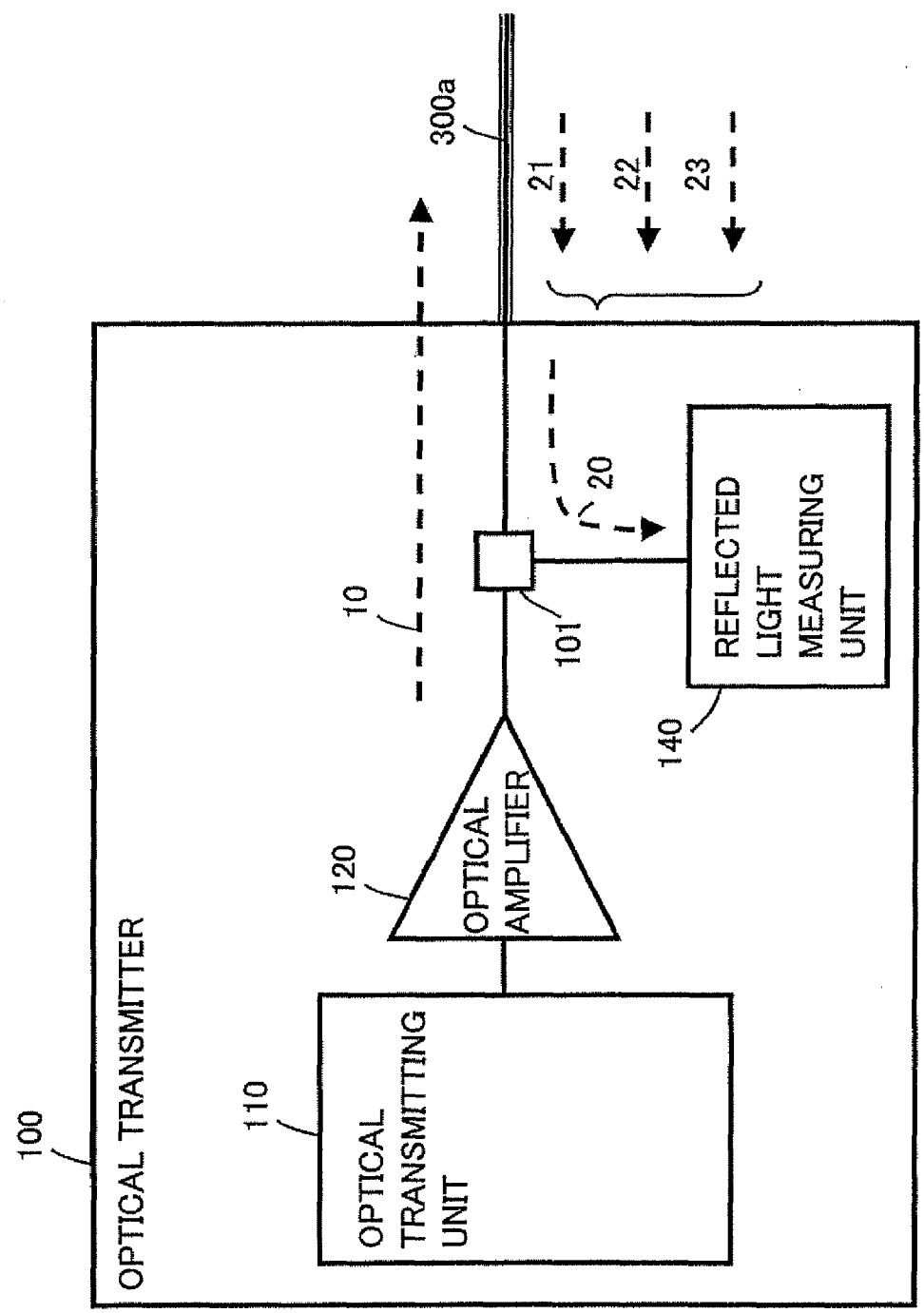
FIG. 2 illustrates an example configuration in which reflected light is measured by an optical transmitter.

As described above with reference to FIG. 2, the reflected light 20 includes the Rayleigh scattering light 21, the Fresnel reflected light 22, and the SBS-induced backward propagating light 23. In FIG. 3, reference numerals 21a, 22a, and 23a represent respective characteristic curves of the Rayleigh scattering light 21, the Fresnel reflected light 22, and the SBS-induced backward propagating light 23.

SBS is one of the nonlinear phenomena of the optical fiber. Therefore, as indicated by the characteristic curve 23a, the power of the SBS-induced backward propagating light 23 rapidly increases as the power of the incident light incident on the optical fiber exceeds a light power threshold 30. Conversely, the powers of the Rayleigh scattering light 21 and the Fresnel reflected light 22 have linearity with respect to the power of the incident light incident on the optical fiber, as indicated by the characteristic curves 21a and 22a, and thus exhibit values proportional to values of the incident light power.

The power of the reflected light 20 is equal to the sum of the powers of the Rayleigh scattering light 21, the Fresnel reflected light 22, and the SBS-induced backward propagating light 23. Therefore, the power of the reflected light 20 is affected by the nonlinear characteristic of the SBS-induced backward propagating light 23, and the actually measured power values of the reflected light 20 form a curve 20a. That is, when the incident light power exceeds the light power threshold 30, linearity of the power of the reflected light 20 is lost, and the power of the reflected light 20 rapidly increases.

According to an embodiment of the present invention, the power of the incident light incident on the optical transmission line 300a is changed under a predetermined condition. Then, values of the reflected light power corresponding to the thus changed values of the incident light power are measured, and a relationship of the reflected light power with the incident light power is obtained. Then, a value of the incident light power at which linearity of the relationship is lost is specified and determined to be the light power threshold of the rapid SBS increase.

The absolute amount of the reflected light power is small, and thus a range of reading error of the absolute amount of the reflected light power is large. Therefore, the optical fiber type can be erroneously identified with high possibility according to the known method on the basis of the measured absolute amount of the reflected light power. Meanwhile, the power of the incident light incident on the optical transmission line amounts to output light power set by the optical transmitter connected to the optical transmission line. Thus, the incident light power can be accurately perceived by the optical transmitter. Therefore, the optical transmitter can accurately specify the incident light power with which the linearity of the relationship between the incident light power and the reflected light power starts to be lost, i.e., the light power threshold of the rapid SBS increase. Further, if the optical fiber type is determined on the basis of the thus specified light power threshold, and if an appropriate incident light power value is set in accordance with the optical fiber type (i.e., a power value smaller than the light power threshold), high data transmission quality can be ensured without causing the rapid increase in SBS.

Figure 4:
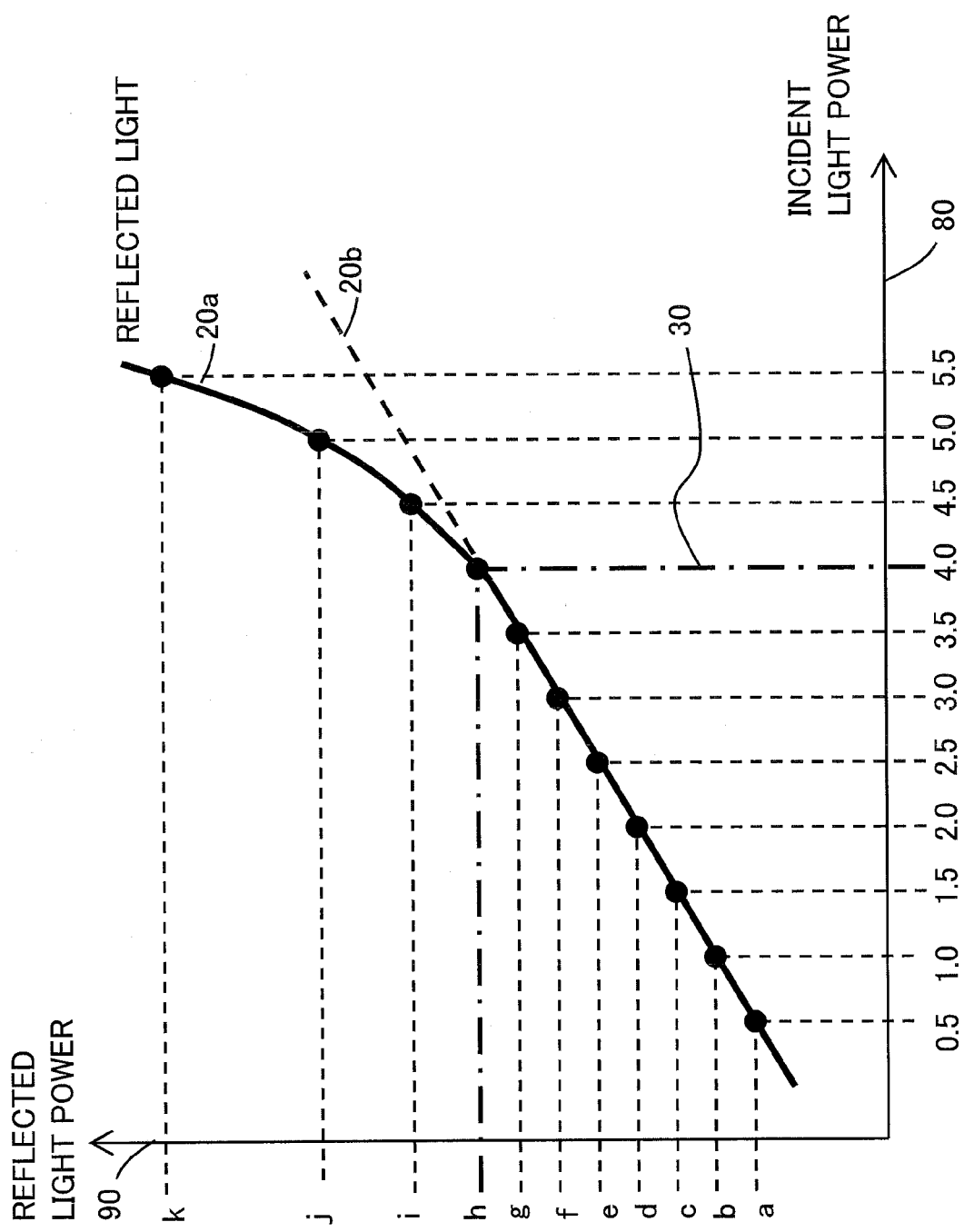
FIG. 4 illustrates a light power threshold calculation method according to an embodiment of the present invention.

FIG. 4 illustrates a light power threshold calculation method according to an embodiment of the present invention.

A reference numeral 20a indicates a characteristic curve of the reflected light power with respect to the incident light power, while a reference numeral 20b indicates a virtual straight line obtained by extending a straight line portion, i.e., a linear portion of the characteristic curve 20a indicating the reflected light power. On the horizontal axis 80 representing the incident light power, values of the incident light power for respective measurement points are indicated by vertical dashed lines arranged in units of mW (milliwatts). Meanwhile, on the vertical axis 90 representing the reflected light power, values of the reflected light power for the respective measurement points are indicated by horizontal dashed lines and assigned with the alphabetic letters a to k. Thus, the relationship between the incident light power and the reflected light power is illustrated.

The power of the incident light incident on the optical transmission line is increased in a phased manner, and the reflected light power is measured for each of the incident light power values. The incident light power can be changed in a variety of ways. FIG. 4 illustrates an example in which the incident light power is changed in the phased manner at even intervals of 0.5 mW. With the incident light power thus changed at even intervals, the amount of change of the measured reflected light power (i.e., a difference between measured values of the reflected light power) can be used as a rate of change. Thus, the light power threshold can be effectively calculated.

In the example of FIG. 4, an initial power value of the incident light power is set at 0.5 mW. Then, a predetermined increment of 0.5 mW is sequentially added, and the reflected light power is measured at each increment. With respect to incident light power values equal to or smaller than 4.0 mW, i.e., 0.5 mW, 1.0 mW, 1.5 mW, 2.0 mW, 2.5 mW, 3.0 mW, 3.5 mW, and 4.0 mW, measured values of the reflected light power are a, b, c, d, e, f, g, and h, respectively. Thus, differences between the measured values of the reflected light power are expressed as b-a, c-b, d-c, e-d, f-e, g-f, and h-g. In this case, all of the obtained differences b-a, c-b, d-c, e-d, f-e, g-f, and h-g have the same value. Therefore, the reflected light power has linearity with respect to the incident light power.

However, when the incident light power reaches 4.5 mW, the reflected light power increases to the value i, and a difference i-h of the reflected light power becomes larger than the preceding difference h-g. That is, the reflected light power nonlinearly increases with respect to the incident light power. Therefore, the light power threshold of the rapid SBS increase is determined to be 4.0 mW prior to the addition of predetermined increment 0.5 mW. In an actual determination process, measurement errors are taken into consideration. Thus, if the amount of change between two adjacent differences falls within a predetermined range, it is determined that no change has been observed.

In this way, the incident light power is changed at the predetermined even intervals in an increasing direction, and the reflected light power values are measured for the respective incident light power values thus changed. Then, the difference between two adjacent values is calculated for each of the thus measured reflected light power values. If one of the thus calculated differences is found to be larger than its immediately preceding difference by a predetermined value, the value of the incident light power immediately preceding the incident light power which causes such an increase is determined to be the light power threshold (of the rapid SBS increase) at which the SBS-induced backward propagating light starts to occur nonlinearly.

In some cases, the reflected light power value at a certain measurement point may be read to be sufficiently high to make the difference exceed the predetermined value of change for some reasons. In such cases, to prevent erroneous identification of the currently used incident light power value as the light power threshold, in addition to the difference in the reflection light power between a current measurement point and its immediately preceding measurement point, the difference in the reflection power between the next measurement point and the measurement point immediately preceding the current measurement point is also calculated. Then, only when both of the two differences are found to be larger than the respective predetermined values, the incident light power value of the measurement point immediately preceding the current measurement point is determined to be the light power threshold. Accordingly, the light power threshold can be definitely calculated without being affected by variations caused by the measurement errors.

Further, if the incident light power is changed at the intervals of 0.5 mW, for example, and if the reflected light power value measured at the initial incident light power value of 0.5 mW is large, the optical fiber may be of a type which tends to exhibit the nonlinearity (e.g., DSF). In such a case, if the reflected light power is measured at the intervals of 0.5 mW, a point at which the SBS-induced backward propagating light rapidly increases may be missed. That is, the measurement interval may be too large. In this case, it is preferable to reduce the measurement interval. Alternatively, in this case, an appropriate measurement interval may be automatically selected on the basis of the power level of the reflected light measured at a first measurement point. For example, if the reflected light power measured at the first measurement point is −30 dBm, the measurement interval may be set to be 0.5 mW, and if the reflected light power measured at the first measurement point is −20 dBm, the measurement interval may be set to be 0.2 mW. Further, if the reflected light power measured at the first measurement point is −10 dBm, the measurement interval may be set to be 0.1 mW.

Furthermore, the power level of the reflected light may be checked not only at the first measurement point but also during each measurement process so that the measurement interval is adjusted to an appropriate value when the power level exceeds a predetermined value.

In the above embodiment of FIG. 4, milliwatt is used as the unit of the incident light power, and the predetermined increment is set to be 0.5 mW, as a typical example. However, the unit of the incident light power and the value of the increment are not limited to the above but are arbitrary.

Figure 5:
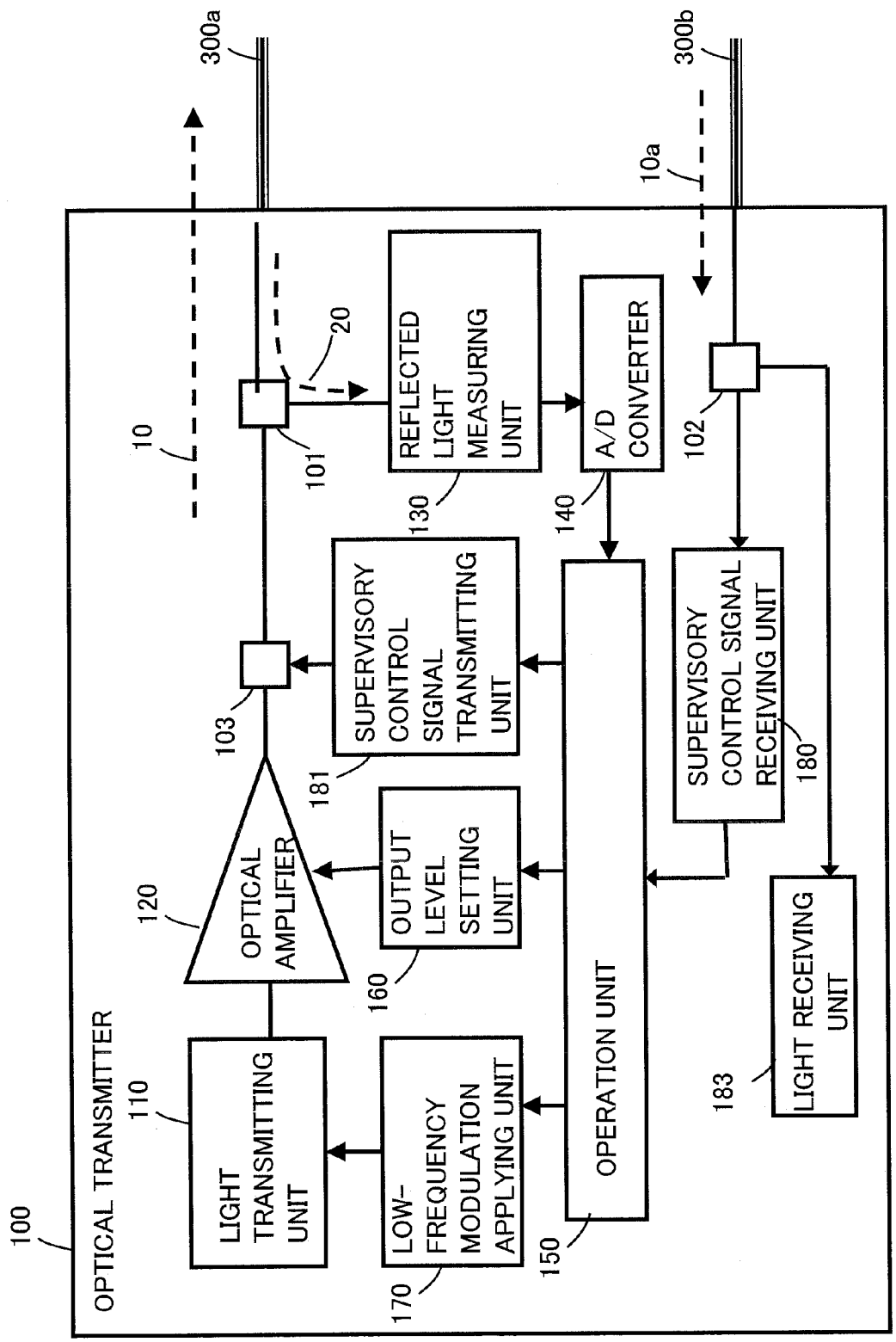
FIG. 5 illustrates an optical transmitter according to an embodiment of the present invention.

FIG. 5 illustrates an optical transmitter according to an embodiment of the present invention.

Light output by a light transmitting unit 110 is amplified by an optical amplifier 120 and input to the optical transmission line 300a. With respect to the output light 10, the reflected light 20 is reflected by the optical transmission line 300a and input to the reflected light measuring unit 130 via the optical coupler 101.

The reflected light measuring unit 130 detects the thus input reflected light 20 with a photodiode, converts the reflected light 20 into an electric signal, and sends the electrical signal to an A/D converter 140.

The A/D converter 140 converts the electrical signal of an analog format received from the reflected light measuring unit 130 into a digital value, and sends the digital value to an operation unit 150.

The operation unit 150 stores the digital value received from the A/D converter 140, which indicates the power of the reflected light 20. Then, the operation unit 150 sends an output level setting unit 160 a command to set the output light power at a value obtained by adding a predetermined increment to a current value of the output light power. The output level setting unit 160 sets, in the optical amplifier 120, the output light power obtained by adding the predetermined increment received from the operation unit 150 to the current value of the output light power. The optical amplifier 120 outputs output light having the output light power added with the predetermined increment, to the optical transmission line 300a. Then, the measured value of the power of the reflected light returned from the optical transmission line 300a is received via the reflected light measuring unit 130 and the A/D converter 140, and the measured value of the reflected light power is stored. The acquisition and storing of the measured value of the reflected light power and the addition of the predetermined increment to the output light power are repeated until the output light power reaches a predetermined upper limit. Thereafter, the difference between the reflected light power obtained by the addition of the predetermined increment and the reflected light power prior to the addition is sequentially calculated in a measurement order. Then, the output light power at a measurement point immediately preceding the measurement point at which the amount of change of the difference becomes equal to or larger than a predetermined value is determined to be the light power threshold of the rapid SBS increase.

After the calculation of the light power threshold, the operation unit 150 sends the output level setting unit 160 a power value adjusted to be equal to or smaller than the light power threshold. The output level setting unit 160 sets the received power value in the optical amplifier 120. Thus, the light power output by the optical transmitter 100 and sent to the optical transmission line 300a is controlled to be equal to or smaller than the calculated light power threshold. Thereby, the data transmission quality is prevented from being deteriorated due to the nonlinear increase in the SBS-induced backward propagating light included in the reflected light 20.

Further, if the operation unit 150 receives, from a supervisory control signal receiving unit 180, insufficient light reception level information indicating that a light reception level at an optical receiver side is insufficient, the operation unit 150 sends a low-frequency modulation applying unit 170 a command to perform application of a low-frequency modulation of a specified frequency. Accordingly, the light power threshold of the output light 10 is increased, as later described. Further, the operation unit 150 performs the above-described light power threshold calculation operation to calculate the light power threshold. Then, the operation unit 150 increases a setting value of the power of the output light 10 within a range equal to or smaller than the calculated light power threshold. This process is repeated until the supervisory control signal receiving unit 180 stops notifying the operation unit 150 of the insufficient light reception level information indicating that the light reception level at the optical receiver side is insufficient. Accordingly, even if the light reception level is decreased when light output by the optical transmitter 100 reaches the optical receiver side over a long transmission distance, and if it becomes difficult to perform the data transmission, the light power threshold of the rapid SBS increase can be increased by applying the frequency amplitude modulation to the output light 10 in the optical transmitter 100. Thus, data can be transmitted without causing the rapid SBS increase, even if the power of the output light is increased. As a result, even in a long-distance data transmission, data can be transmitted while preventing the rapid SBS increase.

Further, the operation unit 150 compares the calculated light power threshold with a previously stored allowable range of the light power threshold of each of the optical fiber types. Thereby, the type of the optical fiber forming the optical transmission line 300a can be identified. As information of the thus identified optical fiber type is sent to the optical receiver side via a supervisory control signal transmitting unit 181, the optical receiver side can perform a dispersion compensation in accordance with the wavelength suitable for the optical fiber type included in the thus sent information.

Operation flows involving operations of the operation unit 150 will be later described with reference to FIGS. 6, 7, 10, and 11.

The output level setting unit 160 sets the output light power value received from the operation unit 150 in the optical amplifier 120 to control the power of the output light 10.

On the basis of frequency information received from the operation unit 150, the low-frequency modulation applying unit 170 controls the light transmitting unit 110 to apply the low-frequency amplitude modulation to the output light 10.

The supervisory control signal receiving unit 180 receives the insufficient light reception level information, which has been sent from the optical receiver side through an optical transmission line 300b, via an optical demultiplexer 102.

The supervisory control signal transmitting unit 181 sends the information indicating the type of the optical fiber forming the optical transmission line 300a identified by the operation unit 150, to the optical transmission line 300a via an optical multiplexer 103 to deliver the information to the optical receiver side.

A light receiving unit 183 receives main signal light sent from the optical receiver side through the optical transmission line 300b, via the optical demultiplexer 102.

As understood from the above description of the operation unit 150 illustrated in FIG. 4, according to the light power adjusting method of the embodiment of the present invention, the difference in the reflected light power corresponding to the predetermined increase in the output light power is obtained. Then, on the basis of the amount of change of the difference, the phenomenon of collapse of the linear relationship between the output light power values and the reflected light power values is detected. Further, the output light power value immediately preceding the output light power value with which the phenomenon occurs is determined to be the light power threshold for preventing the rapid SBS increase. The present method is not affected by the Rayleigh scattering light and the Fresnel reflected light, the powers of which are linearly increased in proportion to the power of the output light. Further, according to the present method, the light power threshold can be determined on the basis of the power of the output light sent to the optical transmission line, which is an accurate and large value. Accordingly, the light power threshold for preventing the rapid SBS increase can be accurately obtained. Furthermore, by setting the output power of light at an appropriate value equal to or smaller than the calculated light power threshold, the signal light can be transmitted while securely preventing the rapid SBS increase.

Figure 6:
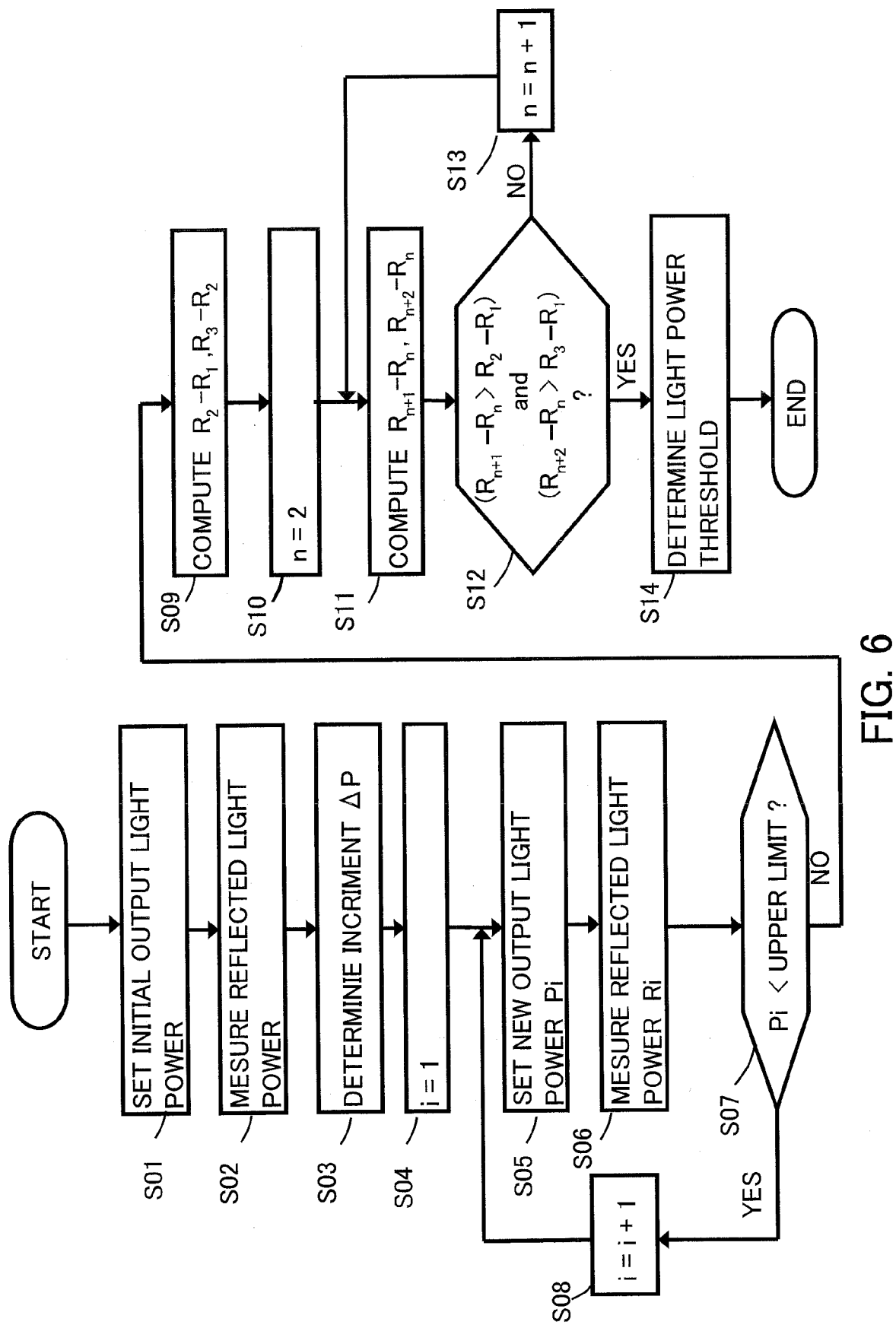
FIG. 6 illustrates an operation flow of a light power threshold calculation operation (1).

FIG. 6 illustrates an operation flow of a light power threshold calculation operation (1).

In the present embodiment, the light power threshold calculation operation is performed to prevent the rapid SBS increase at the optical transmitter side. Therefore, the incident light incident on the optical transmission line is referred to here as the output light. The operation includes the following steps.

At Step S01, the output light power of the optical transmitter side is set to an initial value $P_0$ and light is output to the optical transmission line.

At Step S02, the power of the reflected light returned from the optical transmission line is measured and stored, and the thus stored measured value of the reflected light power is recorded as $R_0$.

At Step S03, a predetermined increment $\Delta P$ of the output light power suitable for the stored measured value of the reflected light power is determined.

At Step S04, an initial value 1 is set in a loop counter i to measure the reflected light.

At Step S05, a value obtained by adding the increment $\Delta P$ to a currently set output light power value is set as new output light power, and the newly set value is recorded as $P_i$ in association with the value of the loop counter i.

At Step S06, the power of the reflected light returned from the optical transmission line with respect to the output light having the power value $P_i$ set at Step S05 is measured and stored, and the stored measured value is recorded as $R_i$.

At Step S07, it is determined whether the output light power value $P_i$ is smaller than a predetermined upper limit. If it is determined that the output light power value $P_i$ is smaller than the predetermined upper limit (YES in Step S07), the operation flow advances to Step S08. Meanwhile, if it is determined that the output light power value $P_i$ reaches the predetermined upper limit (NO in Step S07), the measurement of the reflected light power has been completed. Thus, the operation flow advances to Step S09.

At Step S08, the content of the loop counter i is incremented by the value 1. Then, the operation flow returns to Step S05 to perform a next measurement.

At Step S09, differences $R_2-R_1$ and $R_3-R_1$ between the reflected light power values measured at an initial stage of the measurement of the reflected light power are calculated.

At Step S10, an initial value 2 is set in a processing counter n for calculating the light power threshold.

At Step S11, differences $R_{n+1}-R_n$ and $R_{n+2}-R_n$ between the measured values of the reflected light power corresponding to the current value of the processing counter n are calculated.

At Step S12, the differences between the measured values of the reflected light power corresponding to the current value of the processing counter n are compared with the differences between the measured values of the reflected light power measured at the initial stage of the measurement of the reflected light power. That is, the amounts of change of the differences in the reflected light power are detected. If the amounts of change of the differences are larger than predetermined values, it is determined that the SBS-induced backward propagating light is generated nonlinearly. In this case, the reflected light power value at a certain measurement point may happen to become larger than the reflected light power values at its preceding and following measurement points for some reasons. In such a case, to prevent erroneous identification of the output light power at the certain measurement point as the light power threshold, in addition to the amount of change of the difference in the reflected light power between two adjacent measurement points forming an interval, the amount of change of the difference in the reflected light power between two measurement points forming two adjacent intervals are also calculated. Thus, only when the amounts of change of both of the differences become larger than the respective predetermined values, it is determined that the SBS-induced backward propagating light is generated nonlinearly.

In the operation flow illustrated in FIG. 6, it is determined whether inequalities $(R_{n+1}-R_n)>(R_2-R_1)$ and $(R_{n+2}-R_n)>(R_3-R_1)$ are satisfied. If it is determined that the inequalities $(R_{n+1}-R_n)>(R_2-R_1)$ and $(R_{n+2}-R_n)>(R_3-R_1)$ are satisfied (YES in Step S12), it is determined that the SBS-induced backward propagating light is generated nonlinearly, and the operation flow advances to Step S14. Meanwhile, if it is determined that the inequalities $(R_{n+1}-R_n)>(R_2-R_1)$ and $(R_{n+2}-R_n)>(R_3-R_1)$ are not satisfied (NO in Step S12), it is determined that the reflected light power is linearly increased, and the operation flow advances to Step S13. In the present example, the inequality sign ">" means that the difference between a left side value and a right side value is larger than a predetermined value (i.e., if the difference is equal to or smaller than the predetermined value, the left side value is determined to be equal to the right side value).

At Step S13, the content of the processing counter n is incremented by the value 1. Then, the operation flow returns to Step S11 to perform a comparison operation of the differences of a next measurement point.

At Step S14, an output light power value $P_n$, with which the measured value $R_n$ of the reflected light power corresponding to the current value of the processing counter n is measured, is determined to be the light power threshold. Then, the operation flow ends.

At the initial stage of the measurement of the reflected light in the above operation flow, i.e., at Step 2 in the operation flow, the power of the reflected light returned from the optical transmission line is measured, and on the basis of the thus measured power value of the reflected light, the increment $\Delta P$ of the output light power added in subsequent measurement operations is determined.

For example, if the output light power is changed at the intervals of 0.5 mW, and if the reflected light power value measured at the initial incident light power of 0.5 mW is large, the optical fiber currently used may be of a type which tends to exhibit the nonlinearity (e.g., DSF). In this case, if the reflected light power is measured at the intervals of 0.5 mW, the point at which the SBS-induced backward propagating light rapidly increases may be missed (i.e., the measurement interval may be too large). In such a case, it is preferable to reduce the measurement interval. Further, in this case, the appropriate measurement interval may be automatically selected in accordance with the power level of the reflected light at the first measurement point, as described above in Step S02.

In the light power threshold calculation operation illustrated in FIG. 6, the output light is not limited to any particular type. However, if continuous wave light is used as the output light, the light power threshold can be set at the lowest value, compared with other light used as the output light. With the thus set light power threshold, the rapid SBS increase can be securely prevented for any output light.

Figure 7:
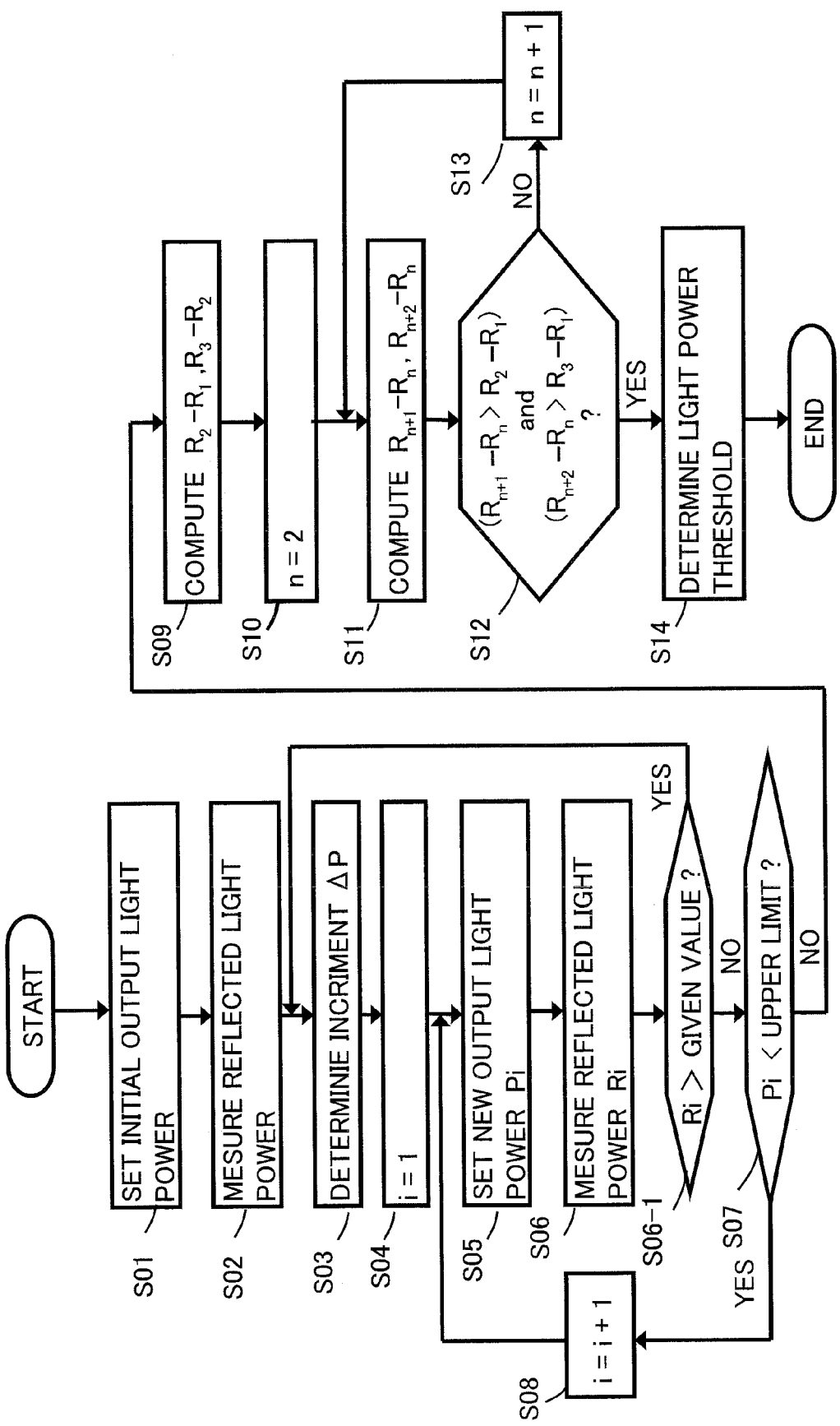
FIG. 7 illustrates an operation flow of a light power threshold calculation operation (2).

FIG. 7 illustrates an operation flow of a light power threshold calculation operation (2).

Compared with the operation flow of the light power threshold calculation operation (1) illustrated in FIG. 6, the light power threshold calculation operation (2) includes an additional step immediately after Step S6 for changing the increment $\Delta P$ of the output light power in a case in which the reflected light power exceeds a predetermined value.

At Step S01, the output light power of the optical transmitter side is set to an initial value $P_0$ and light is output to the optical transmission line.

At Step S02, the power of the reflected light returned from the optical transmission line is measured and stored, and the thus stored measured value of the reflected light power is recorded as $R_0$.

At Step S03, a previously set increment $\Delta P$ of the output light power suitable for the stored measured value of the reflected light power is determined.

At Step S04, an initial value 1 is set in a loop counter i to measure the reflected light.

At Step S05, a value obtained by adding the increment $\Delta P$ to a currently set output light power value is set as a new output light power, and the newly set value is recorded as $P_i$ in association with the value of the loop counter i.

At Step S06, the power of the reflected light returned from the optical transmission line with respect to the output light having the power value $P_i$ set at Step S05 is measured and stored, and the stored measured value is recorded as $R_i$.

At Step S06-1, it is determined whether the stored measured value of the reflected light power exceeds a predetermined value. If it is determined that the stored measured value of the reflected light power exceeds the predetermined value (YES in Step S06-1), the operation flow returns to Step S03 to change the increment $\Delta P$ of the output light power. Meanwhile, if it is determined that the stored measured value of the reflected light power does not exceed the predetermined value (NO in Step S06-1), the operation flow advances to Step S07.

At Step S07, it is determined whether the output light power value $P_i$ is smaller than a predetermined upper limit. If it is determined that the output light power value $P_i$ is smaller than the predetermined upper limit (YES in Step S07), the operation flow advances to Step S08. Meanwhile, if it is determined that the output light power value $P_i$ reaches the predetermined upper limit (NO in Step S07), the measurement of the reflected light power has been completed. Thus, the operation flow advances to Step S09.

At Step S08, the content of the loop counter i is incremented by the value 1. Then, the operation flow returns to Step S05 to perform a next measurement.

At Step S09, differences $R_2-R_1$ and $R_3-R_1$ between the reflected light power values measured at an initial stage of the measurement of the reflected light power are calculated.

At Step S10, an initial value 2 is set in a processing counter n for calculating the light power threshold.

At Step S11, differences $R_{n+1}-R_n$ and $R_{n+2}-R_n$ between the measured values of the reflected light power corresponding to the current value of the processing counter n are calculated.

At Step S12, the differences between the measured values of the reflected light power corresponding to the current value of the processing counter n are compared with the differences between the measured values of the reflected light power measured at the initial stage of the measurement of the reflected light power. That is, the amounts of change of the differences in the reflected light power are detected. If the thus detected amounts of change of the differences are larger than predetermined values, it is determined that the SBS-induced backward propagating light is generated nonlinearly. In this case, the reflected light power value at a certain measurement point may happen to become larger than the reflected light power values at its preceding and following measurement points for some reasons. In such a case, to prevent erroneous identification of the output light power at the certain measurement point as the light power threshold, in addition to the amount of change of the difference in the reflected light power between two adjacent measurement points forming an interval, the amount of change of the difference in the reflected light power between two measurement points forming two adjacent intervals are also calculated. Thus, only when the amounts of change of both of the differences become larger than the respective predetermined values, it is determined that the SBS-induced backward propagating light is generated nonlinearly.

Specifically, it is determined whether inequalities $(R_{n+1}-R_n)>(R_2-R_1)$ and $(R_{n+2}-R_n)>(R_3-R_1)$ are satisfied. If it is determined that the inequalities $(R_{n+1}-R_n)>(R_2-R_1)$ and $(R_{n+2}-R_n)>(R_3-R_1)$ are satisfied (YES in Step S12), it is determined that the SBS-induced backward propagating light is generated nonlinearly, and the operation flow advances to Step S14. Meanwhile, if it is determined that the inequalities $(R_{n+1}-R_n)>(R_2-R_1)$ and $(R_{n+2}-R_n)>(R_3-R_1)$ are not satisfied (NO in Step S12), it is determined that the reflected light power is linearly increased, and the operation flow advances to Step S13. In the present example, the inequality sign ">" means that the difference between a left side value and a right side value is larger than a predetermined value (i.e., if the difference is equal to or smaller than the predetermined value, the left side value is determined to be equal to the right side value.

At Step S13, the content of the processing counter n is incremented by the value 1. Then, the operation flow returns to Step S11 to perform a comparison operation of the differences of a next measurement point.

At Step S14, an output light power value $P_n$, with which the measured value $R_n$ of the reflected light power corresponding to the current value of the processing counter n is measured, is determined to be the light power threshold. Then, the operation flow ends.

With the operation of Step S06-1 thus added, the measurement interval $\Delta P$ is adjusted not only at the first measurement point but also during the measurement operation when the reflected light power reaches a predetermined value (e.g., -20 dBm), and the light power threshold calculation operation is performed again. Accordingly, the light power threshold can be calculated more accurately.

If either one of the light power threshold calculation operations illustrated in FIGS. 6 and 7 is performed, the output light power with which SBS starts to rapidly increase, i.e., the light power threshold can be automatically obtained, even if the type of the optical fiber forming the optical transmission line is unknown. Further, if the output light power of the optical transmitter is set at a value equal to or smaller than the calculated light power threshold, the nonlinear increase in the SBS-induced backward propagating light is prevented. Accordingly, high data transmission quality can be ensured.

FIGS. 8A to 8D illustrate an overview of influence of the low-frequency amplitude modulation applied to light.

For the convenience of explanation, the present example illustrates the low-frequency amplitude modulation applied to continuous wave light. However, the concept explained below can also apply to other cases in which the continuous wave light is not used.

When the horizontal axis and the vertical axis represent the time component and the light power, respectively, the continuous wave light having a constant power value is expressed as a straight line 12a shown in a graph A1 of FIG. 8A. Meanwhile, when the horizontal axis and the vertical axis represent the wavelength component and the light power intensity, respectively, the continuous wave light is expressed as a curve 12b shown in a graph A2 of FIG. 8B.

If the continuous wave light expressed as the straight line 12a in the graph A1 is applied with the low-frequency amplitude modulation of a frequency in an approximate range of a few kilohertz to a few megahertz, for example, a relationship of the light power with the time is expressed as a curve 13a shown in a graph B1 of FIG. 8C. If the wavelength component and the light power intensity are represented by the horizontal axis and the vertical axis, respectively, the above relationship is expressed as a curve 13b shown in a graph B2 of FIG. 8D. Compared with the curve 12b of the graph A2, a peak value of the light power intensity is suppressed in the curve 13b of the graph B2, and thus the curve 13b is spread in directions of the horizontal axis representing the wavelength component. The light power indicated by the curve 12b of the graph A2 (i.e., an integration value of the curve with respect to the wavelength component) is equal to the light power indicated by the curve 13b of the graph B2 (i.e., an integration value of the curve with respect to the wavelength component). Therefore, the light power intensity per wavelength component is smaller in the curve 13b than in the curve 12b. The suppression of the peak value of the curve 13b and the spread of the curve 13b in the directions of the wavelength component are increased as the frequency of the applied low-frequency amplitude modulation is increased. Accordingly, the light power intensity per wavelength component is reduced.

As is known, the extent of the non-linearity of the optical fiber depends on the light power intensity per wavelength component. Thus, when the light power intensity per wavelength component is increased, influence on the non-linearity of the optical fiber is also increased. Conversely, when the light power intensity per wavelength component is decreased, the influence on non-linearity of the optical fiber is also decreased.

Therefore, as the light power intensity per wavelength component is decreased, the nonlinear phenomenon occurs more infrequently. Further, the light power threshold, which is a starting point of the rapid increase in a nonlinear phenomenon SBS, is increased.

Figure 9:
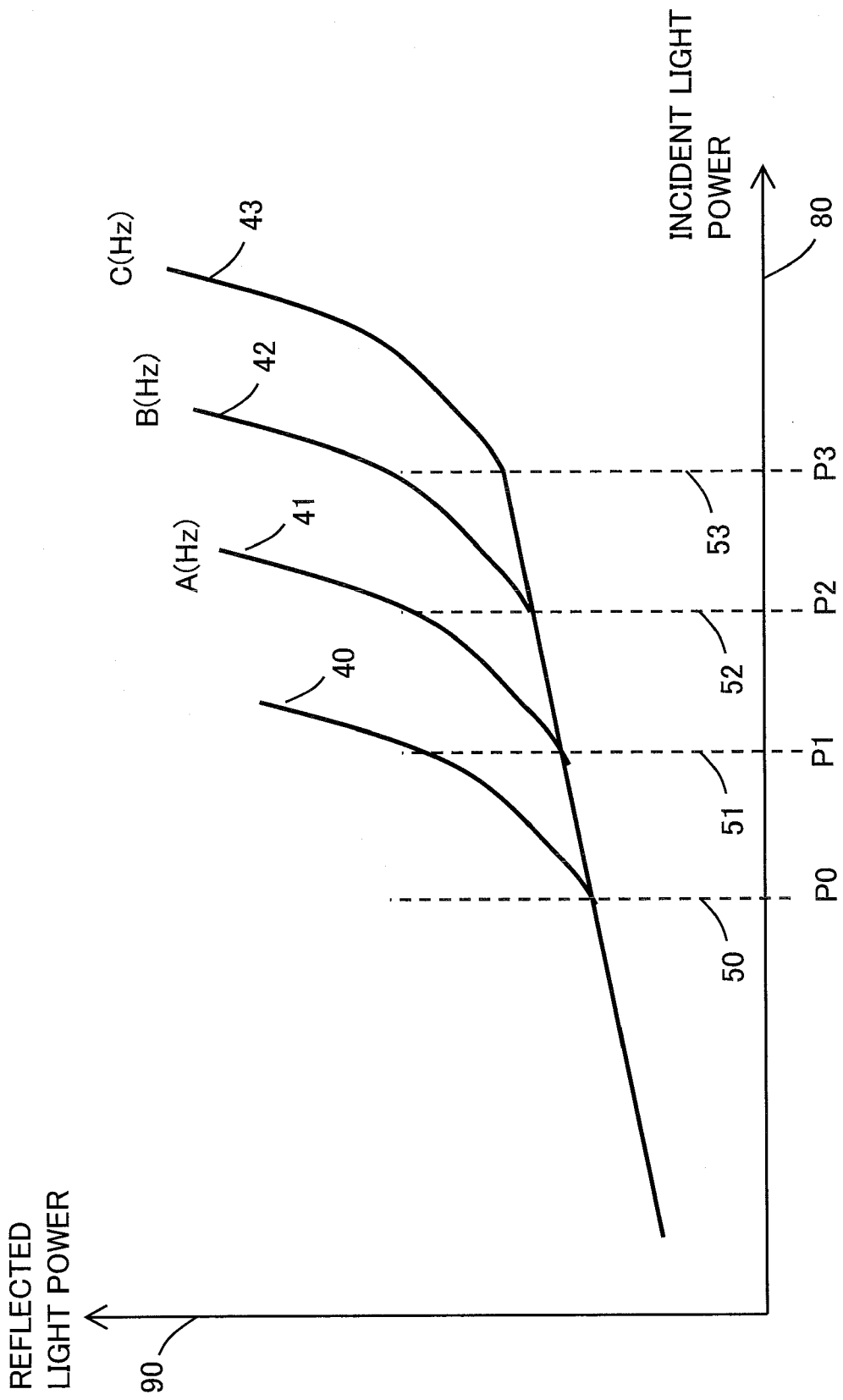
FIG. 9 is a graph representing a pattern of changes of the light power threshold caused by application of the low-frequency amplitude modulation.

FIG. 9 is a graph illustrating a model pattern of changes of the light power threshold caused by application of the low-frequency amplitude modulation.

As described above with reference to FIGS. 8A to 8D, if the incident light incident on the optical transmission line is applied with the low-frequency amplitude modulation, the light power intensity per wavelength component of the incident light is decreased. Thus, the light power threshold, i.e., the starting point of the rapid increase in a nonlinear phenomenon SBS, is increased. FIG. 9 illustrates this mechanism.

In a curve 40 which indicates a case in which the low-frequency amplitude modulation is not applied, the light power threshold is a value $P_0$ corresponding to a dashed line 50. As the applied modulation frequency is increased in the order of A (Hz), B (Hz), and C (Hz) (i.e., A<B<C), characteristic curves 41, 42, and 43 are obtained, respectively. Further, as the applied frequency is increased, a dashed line indicating a point at which a linear portion of a characteristic curve starts to nonlinearly increase (i.e., the light power threshold) moves to the right in the order of dashed lines 51, 52, and 53. That is, the light power threshold at which the SBS-induced backward propagating light nonlinearly increases is increased in the order of points P1, P2, and P3. In this way, the threshold of the incident light power is increased as the frequency of the low-frequency amplitude modulation applied to the incident light is increased.

If the above characteristic is used, i.e., if the incident light is applied with the low-frequency amplitude modulation of an appropriate frequency, the incident light power can be increased while preventing the rapid SBS increase. That is, in the optical transmitter connected to the optical transmission line, if the frequency of the low-frequency amplitude modulation applied to the output light of the optical transmitter is appropriately controlled, the signal light can be transmitted over a long distance without causing the rapid SBS increase.

Figure 10:
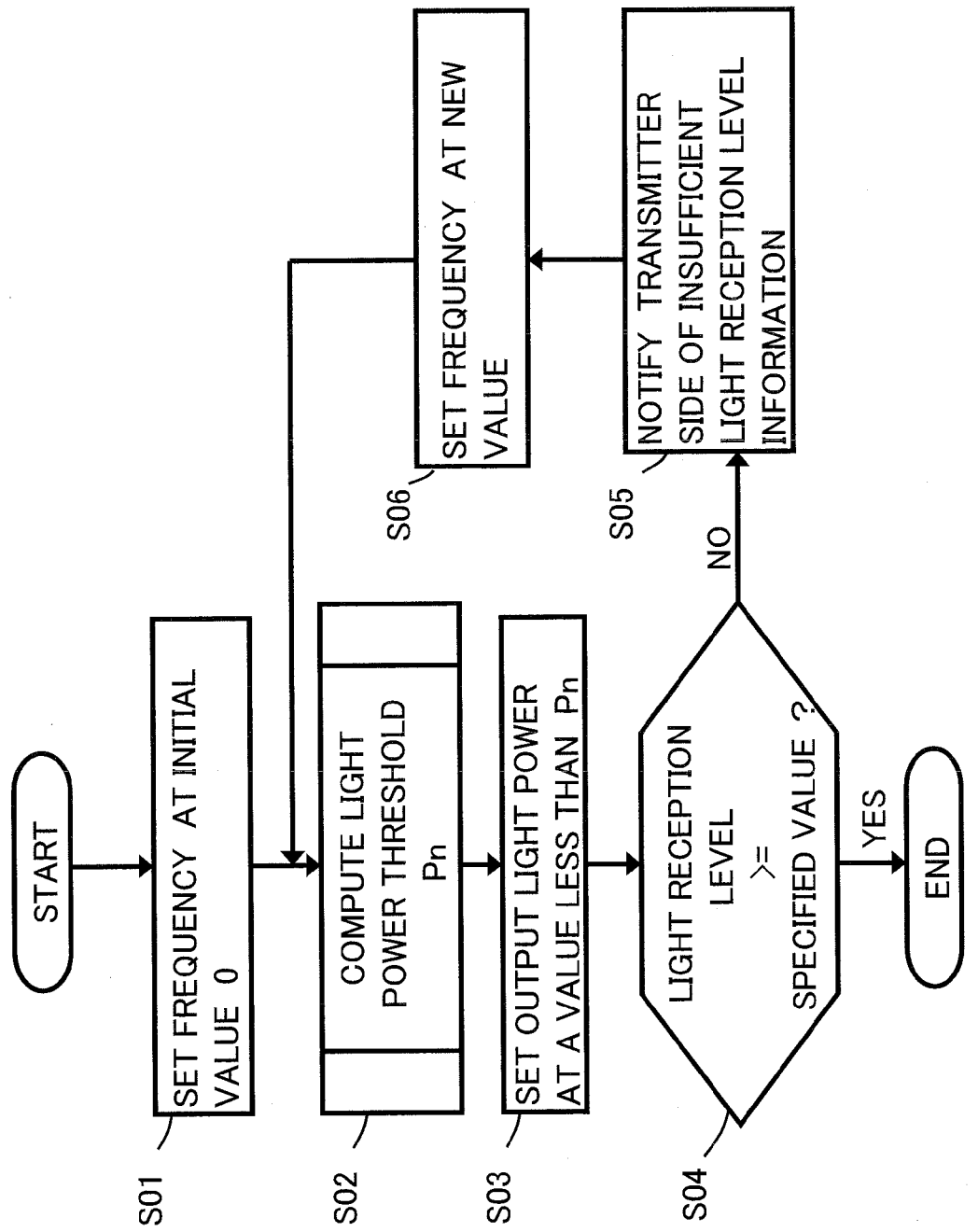
FIG. 10 illustrates an operation flow of a light power adjustment operation (1) using application of the low-frequency amplitude modulation.

FIG. 10 illustrates an operation flow of a light power adjustment operation (1) using application of the low-frequency amplitude modulation.

The flowchart of FIG. 10 illustrates a first embodiment of the present invention in which the optical transmitter connected to the optical transmission line adjusts the power of the output light in cooperation with the optical receiver connected to the optical transmission line. Further, in the present embodiment, the optical receiver only sends the optical transmitter notification information notifying that the light reception level is insufficient and does not send information concerning an insufficient amount of the reception level.

The present operation includes the following steps.

At Step S01, the optical transmitter side sets the initial value of the frequency f of the low-frequency amplitude modulation to be applied at 0 Hz. That is, the frequency f is set not to apply the low-frequency amplitude modulation.

At Step S02, the optical transmitter side performs either one of the light power threshold calculation operations (1) and (2) illustrated in FIGS. 6 and 7, and the light power threshold $P_n$ is obtained.

At Step S03, the optical transmitter side sets the output light power at an appropriate value equal to or smaller than the light power threshold $P_n$ obtained at Step S02.

At Step S04, the optical receiver side determines whether the light reception level of a received light is equal to or higher than a specified value. If it is determined that the light reception level of the received light does not reach the specified value (NO in Step S04), the applied frequency is insufficient, and thus the operation flow advances to Step S05. Meanwhile, if it is determined that the light reception level of the received light reaches the specified value (YES in Step S04), the operation flow ends.

At Step S05, the optical receiver side sends the optical transmitter side the insufficient light reception level information in the form of a supervisory control signal, and the operation flow advances to Step S06. This insufficient light reception level information only forms the notification information notifying that the light reception level is insufficient and does not include the information concerning the insufficient amount of the light reception level.

At Step S06, the optical transmitter side sets a value obtained by adding a predetermined value Δf to the frequency f of the currently applied low-frequency amplitude modulation as the frequency f of the newly applied low-frequency amplitude modulation. Then, the operation flow returns to Step S02 to perform again the light power threshold calculation operation.

As illustrated in the above operation flow, the optical transmitter side calculates the output light power of the optical transmitter (i.e., the power of the incident light incident on the optical transmission line) through the light power threshold calculation operation, and sets the output light power at the appropriate value equal to or smaller than the calculated output light power. Thereafter, if the light reception level is lower than the specified value, the optical receiver side sends the optical transmitter side the insufficient light reception level information through the supervisory control signal. Upon receipt of the insufficient light reception level information, the optical transmitter performs again the operation of determining the threshold of the output light power, with the frequency of the applied low-frequency amplitude modulation increased by a predetermined value. The above process is repeated until the light reception level at the optical receiver side becomes equal to or higher than the specified value.

Accordingly, even if the transmission distance between the optical transmitter and the optical receiver is long, and thus the light reception level of light output by the optical transmitter with certain output light power is decreased to be lower than the specified value when the light reaches the optical receiver, and if it is difficult to normally transmit data, the output light power of the optical transmitter can be increased to a level enabling the optical receiver to normally receive the data.

Figure 11:
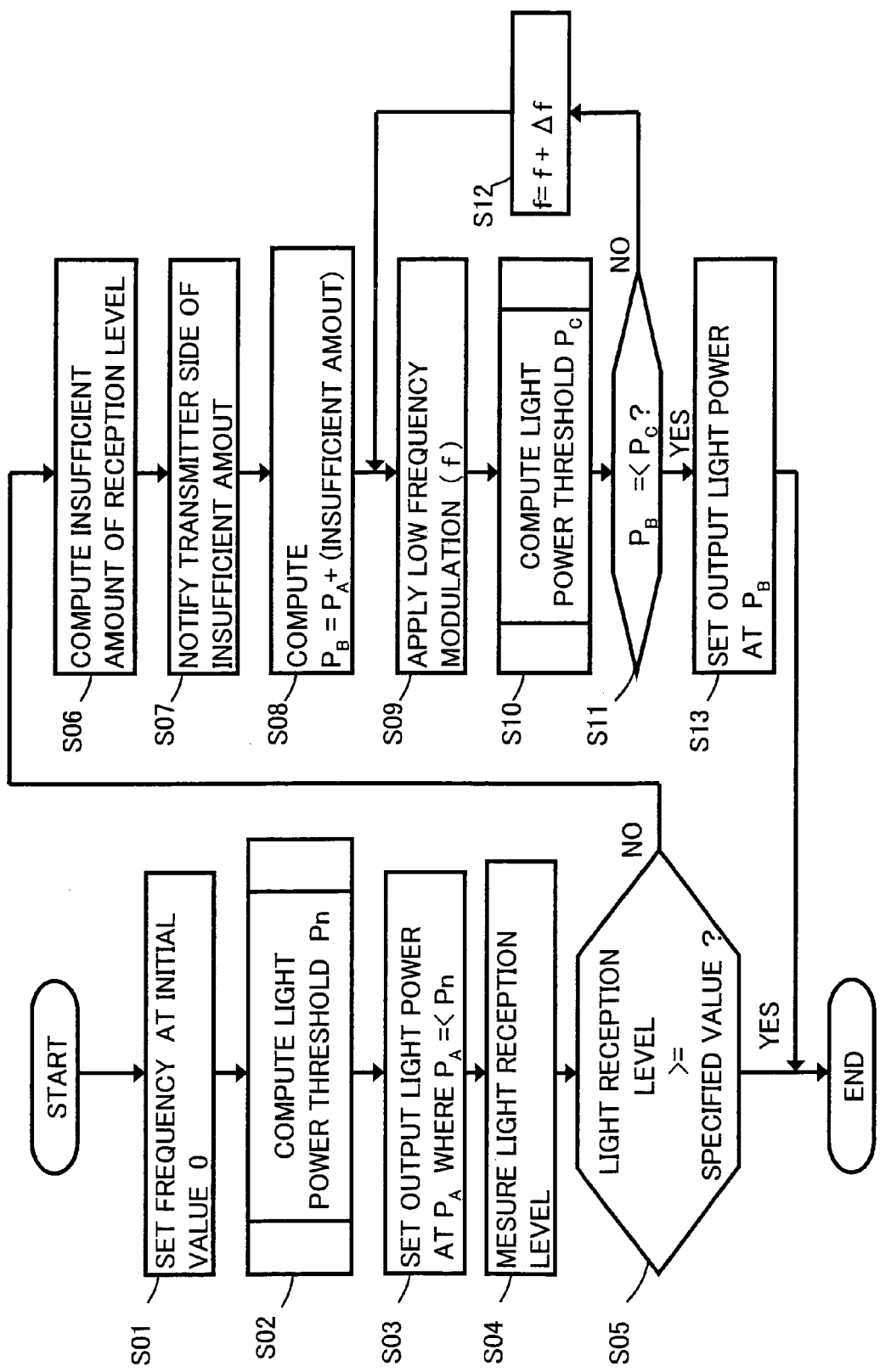
FIG. 11 illustrates an operation flow of a light power adjustment operation (2) using application of the low-frequency amplitude modulation.

FIG. 11 illustrates an operation flow of a light power adjustment operation (2) using application of the low-frequency amplitude modulation.

The flowchart of FIG. 11 illustrates a second embodiment of the present invention in which the optical transmitter connected to the optical transmission line adjusts the power of the output light in cooperation with the optical receiver connected to the optical transmission line. Further, in the present embodiment, the optical transmitter side receives the information concerning the insufficient amount of the light reception level from the optical receiver side, and performs addition of appropriate power in accordance with the insufficient amount so that the optical receiver side can normally receive data. The present operation includes the following steps.

At Step S01, the optical transmitter side sets the initial value of the frequency f of the low-frequency amplitude modulation to be applied at 0 Hz. That is, the frequency f is set not to apply the low-frequency amplitude modulation.

At Step S02, the optical transmitter side performs either one of the light power threshold calculation operations (1) and (2) illustrated in FIGS. 6 and 7, and the light power threshold $P_n$ is obtained.

At Step S03, the optical transmitter side sets the output light power at an appropriate value $P_A$ equal to or smaller than the light power threshold $P_n$ obtained at Step S02.

At Step S04, the optical receiver side measures the light reception level.

At Step S05, the optical receiver side determines whether the measured light reception level is equal to or higher than a specified value. If it is determined that the measured light reception level does not reach the specified value, i.e., the measured light reception level is lower than the specified value (NO in Step S05), the operation flow advances to Step S06. If it is determined that the measured light reception level of the received light is equal to or higher than the specified value (YES in Step S05), the operation flow ends.

At Step S06, the optical receiver side calculates an actual insufficient amount of the light reception level with respect to the specified value.

At Step S07, the optical receiver side sends the optical transmitter side the insufficient light reception level information including the calculated insufficient amount of the light reception level in the form of a supervisory control signal.

At Step S08, the optical transmitter side obtains a value $P_B$ by adding the currently set output light power value $P_A$ to the insufficient amount of the light reception level included in the insufficient light reception level information sent by the optical receiver side.

At Step S09, the optical transmitter side applies the low-frequency amplitude modulation of the frequency f to the output light output by the optical transmitter side.

At Step S10, the optical transmitter side performs either one of the light power threshold calculation operations (1) and (2) illustrated in FIGS. 6 and 7, and the light power threshold $P_C$ is obtained.

At Step S11, the optical transmitter side determines whether the light power value $P_B$ obtained by the addition of the insufficient amount of the light reception level at Step S08 is equal to or smaller than the light power threshold $P_C$ calculated at Step S10. If it is determined that the light power value $P_B$ is equal to or smaller than the light power threshold $P_C$ (YES in Step S11), the operation flow advances to Step S13. If it is determined that the light power value $P_B$ is larger than the light power threshold $P_C$ (NO in Step S11), the operation flow advances to Step S12.

At Step S12, the optical transmitter side sets a frequency obtained by adding a predetermined frequency Δf to the frequency f of the currently applied low-frequency amplitude modulation as the frequency f of the newly applied low-frequency amplitude modulation. Then, the operation flow advances to Step S09.

At Step S13, the optical transmitter side sets the light power value $P_B$ obtained by the addition of the insufficient amount of the light reception level at Step S08 as the output light power, and the operation flow ends.

According to the method illustrated in the operation flow of FIG. 11, adjustment of the output light power of the optical transmitter side can be effectively performed such that the light reception level at the optical receiver side is at the appropriate value, simply by performing one exchange of the supervisory control signal between the optical transmitter side and the optical receiver side.

Figure 12:
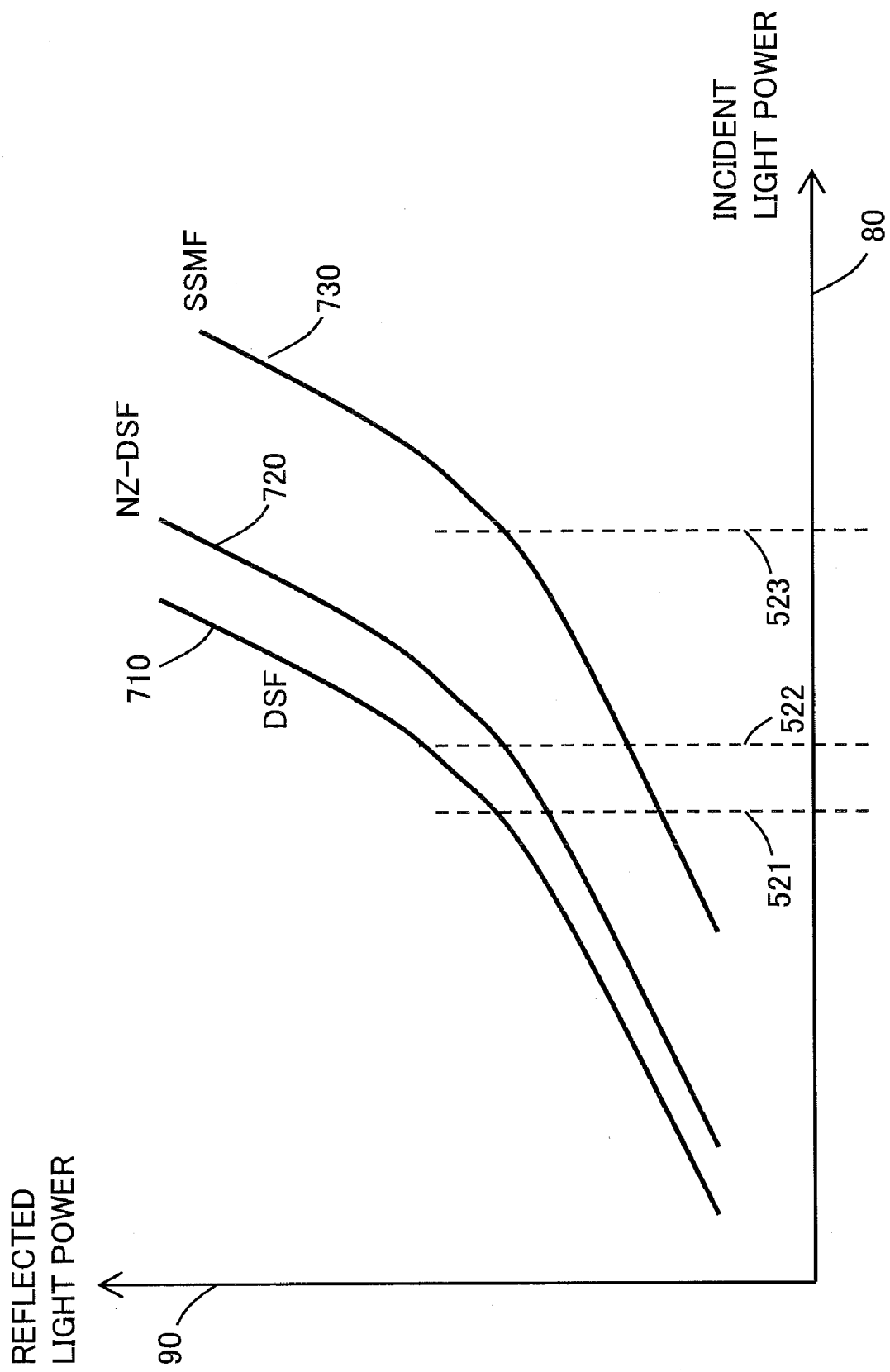
FIG. 12 is a graph illustrating a relationship of the reflected light power with the incident light power with respect to types of optical fibers forming the optical transmission line.

FIG. 12 is a graph illustrating a relationship of the reflected light power with the incident light power with respect to the optical fiber types.

The graph illustrates a characteristic overview of typical optical fiber types DSF, NZ-DSF, and SSMF.

Reference numerals 710, 720, and 730 indicate characteristic curves of the optical fiber types DSF, NZ-DSF, and SSMF, respectively.

The incident light powers with which the SBS-induced backward propagating light starts to nonlinearly increase, i.e., the light power thresholds for the optical fiber types the DSF, the NZ-DSF, and the SSMF are indicated by dashed lines 521, 522, and 523, respectively.

As is known, the light power threshold of an optical fiber is proportional to the inverse number of the effective cross section area Aeff of the core of the optical fiber. Aeff values of the optical fiber types DSF, NZ-DSF, and SSMF are approximately 85 [$\mu m^2$], approximately 50 [$\mu m^2$], and approximately 55 [$\mu m^2$], respectively. That is, the Aeff value of NZ-DSF is approximately 1.1 times of the Aeff value of DSF (i.e., approximately 0.4 dB), and the Aeff value of SSMF is approximately 1.5 times to approximately 1.7 times of the Aeff values of DSF and NZ-DSF (i.e., approximately 1.9 dB to approximately 2.3 dB).

Therefore, the difference between DSF and NZ-DSF is small, and thus it is relatively difficult to distinguish between DSF and NZ-DSF. Meanwhile, the difference between SSMF and DSF or NZ-DSF is large, and thus SSMF can be easily distinguished from DSF or NZ-DSF.

The dispersion characteristic of light depends on the type of the optical fiber through which the light is transmitted. Therefore, as described later, the optical receiver side can perform the dispersion compensation suitable for each of the optical fiber types on the basis of information of the optical fiber type.

It is relatively difficult to distinguish between DSF and NZ-DSF due to the small difference between them. However, a dispersion amount of DSF is close to a dispersion amount of NZ-DSF. For example, a dispersion value of a DSF optical fiber at a wavelength of 1550 nm is approximately 0 ps/nm/km, while a dispersion value of an NZ-DSF optical fiber at the wavelength of 1550 nm is approximately 2 ps/nm/km. Therefore, to roughly adjust the dispersion compensation, the distinction between DSF and NZ-DSF is not particularly necessary. Thus, DSF and NZ-DSF can be treated as one optical fiber type DSF/NZ-DSF.

Further, the light power threshold calculation method according to the embodiment of the present invention does not depend on the optical fiber types, and thus can be applied to any optical fiber types. Therefore, the distinction between the optical fiber types is not particularly necessary for setting the light power at a value preventing the nonlinear increase in SBS.

Figure 13:
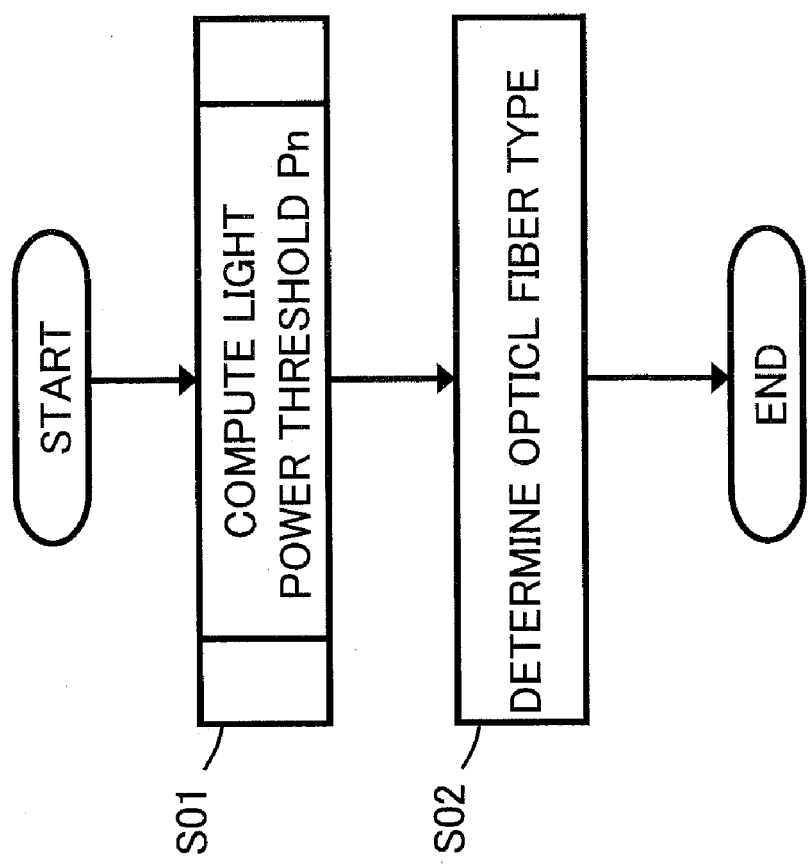
FIG. 13 illustrates an operation flow of an operation of identifying the type of the optical fiber forming the optical transmission line.

FIG. 13 illustrates an operation flow of an operation of identifying the type of the optical fiber forming the optical transmission line.

In this example, information of optical fiber types and information of a tolerance range of the light power threshold for each of the optical fiber types are previously stored, with the two information being associated with each other. The present operation includes the following steps.

At Step S01, either one of the light power threshold calculation operations (1) and (2) described above with reference to FIGS. 6 and 7 is performed, and the light power threshold $P_n$ of a currently connected optical fiber type is calculated.

At Step S02, the previously stored information of the tolerance range of the light power threshold for each of the optical fiber types is compared with the light power threshold $P_n$ calculated at Step S01. Thereby, the optical fiber type corresponding to the information of the tolerance range of the light power threshold including the light power threshold $P_n$ is identified. Then, the operation flow ends.

Accordingly, even if a currently used optical fiber type forming the optical transmission line is not previously known, the optical fiber type forming the optical transmission line can be automatically identified. For example, whether the type of the currently used optical fiber is SSMF or DSF/NZ-DSF can be determined.

Figure 14:
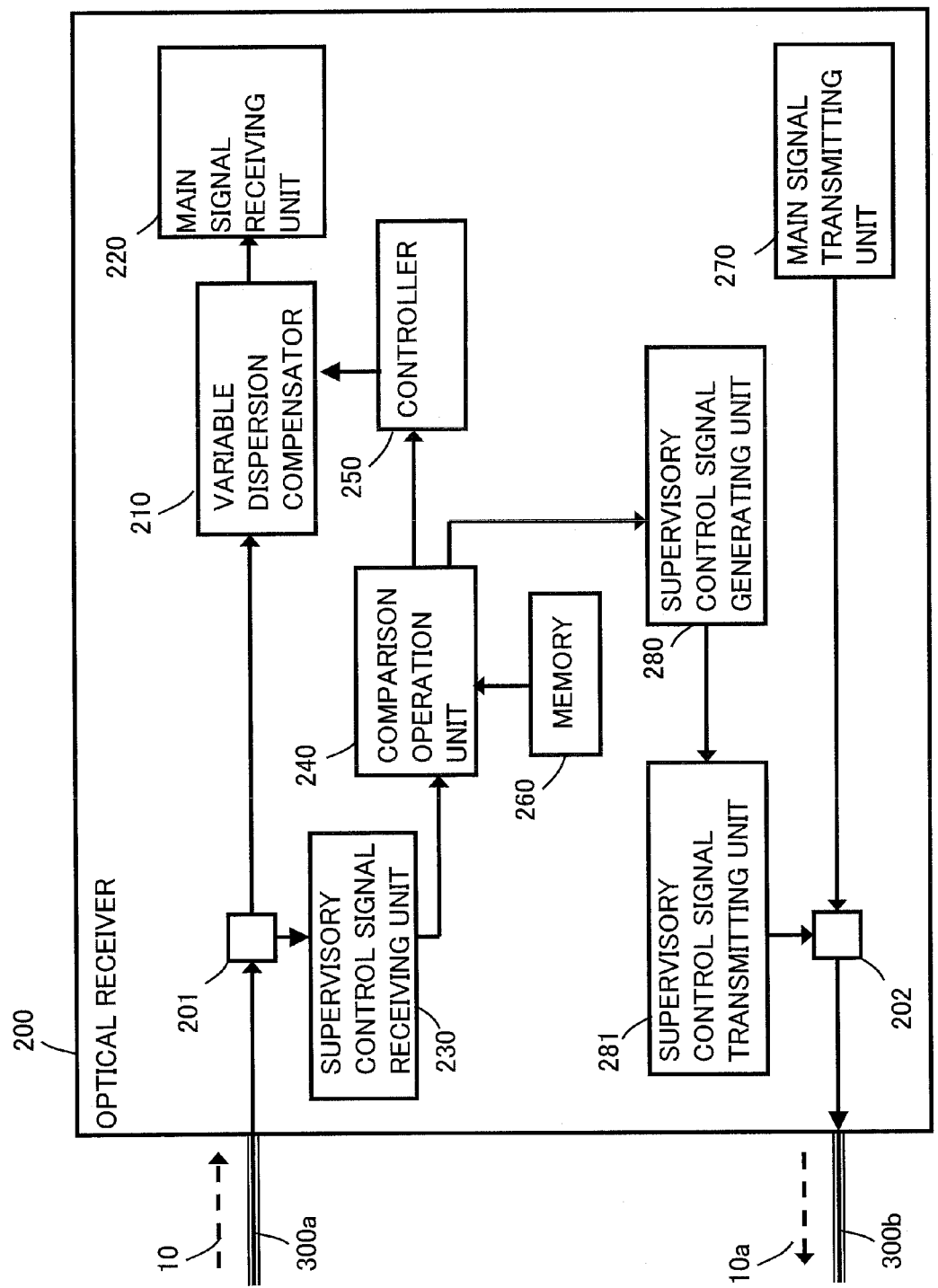
FIG. 14 illustrates an example configuration of an optical receiver according to an embodiment of the present invention.

FIG. 14 illustrates an example configuration of an optical receiver according to an embodiment of the present invention.

Light 10 received from the optical transmission line 300*a* is divided into a main signal and a supervisory control signal by an optical demultiplexer 201. The main signal is first subjected to the dispersion compensation by a variable dispersion compensator 210, and then is sent to a main signal receiving unit 220.

A supervisory control signal receiving unit 230 detects the light reception level of the light 10 received from the optical demultiplexer 201, and sends information of the detected light reception level to a comparison operation unit 240.

The comparison operation unit 240 compares the received light reception level with a specified light reception level. Then, if the received light reception level does not reach the specified light reception level, the comparison operation unit 240 sends the insufficient light reception level information to a supervisory control signal generating unit 280, and also sends a command to send the insufficient light reception level information to the optical transmitter side.

The supervisory control signal generating unit 280 generates a supervisory control signal which includes the insufficient light reception level information received from the comparison operation unit 240, and requests a supervisory control signal sending unit 281 to send the generated supervisory control signal to the optical transmitter side.

The supervisory control signal sending unit 281 sends the supervisory control signal 10*a* including the insufficient light reception level information received from the supervisory control signal generating unit 280, to the optical transmission line 300*b* via an optical multiplexer 202.

There are two ways of configuring the insufficient light reception level information. That is, the insufficient light reception level information may be configured to form the notification information simply notifying that the light reception level is insufficient. Alternatively, the insufficient light reception level information may be configured to include the insufficient amount with respect to the specified light reception level.

When the notification information simply notifying insufficiency of the light reception level is sent to the optical transmitter side, the optical transmitter side applies the low-frequency amplitude modulation to the output light, and increases the output light power to a level such that the light reception level at the optical receiver 200 reaches the specified value. In this case, the optical receiver 200 continues to send the insufficient light reception level information until the light reception level at the optical receiver 200 reaches the specified value.

Meanwhile, when the insufficient amount with respect to the specified light reception level is sent to the optical transmitter side, the optical transmitter side adds light power corresponding to the insufficient amount of the light reception level to the current output light power, and at the same time adjusts the output light power by applying the low-frequency amplitude modulation to the output light such that the light power threshold is larger than the output light power thus obtained by the addition. Accordingly, the light reception level at the optical receiver 200 reaches the specified value. In this case, the optical receiver 200 sends the insufficient light reception level information only once.

A memory 260 stores dispersion information for each of the optical fibers. As a method of storing the dispersion information, information of the optical fiber types and chromatic dispersion values of respective wavelengths corresponding to the optical fiber types may be stored. As an alternative method, the information of the optical fiber types, chromatic dispersion values of predetermined reference wavelengths corresponding to the optical fiber types, and dispersion slope values may be stored so that the chromatic dispersion value of each of the wavelengths is calculated on the basis of the dispersion slope value. A method of calculating the chromatic dispersion value of each of the wavelengths on the basis of the dispersion slope value will be later described with reference to FIG. 15.

When optical fiber type information is sent from the optical transmitter side in the form of the supervisory control signal, the supervisory control signal receiving unit 230 sends the optical fiber type information to the comparison operation unit 240.

On the basis of the received optical fiber type information, the comparison operation unit 240 extracts the dispersion information corresponding to the optical fiber type from the dispersion information of the optical fibers stored in the memory 26. Then, the comparison operation unit 240 obtains the chromatic dispersion value of each of the wavelengths on the basis of the extracted dispersion information. The thus obtained chromatic dispersion value is multiplied by a previously known distance of the optical transmission line 300a. Thereby, a total dispersion amount of each of the wavelengths is obtained.

A control unit 250 sends the total dispersion amount of each of the wavelengths obtained by the comparison operation unit 240 to the variable dispersion compensator 210.

On the basis of the total dispersion amount of each of the wavelengths received from the control unit 250, the variable dispersion compensator 210 performs the dispersion compensation to each of the wavelengths of the main signal received from the optical transmission line 300a. Then, the variable dispersion compensator 210 sends the dispersion compensated signal to the main signal receiving unit 220.

Accordingly, the optical receiver side automatically identifies the type of the optical fiber actually used for the optical transmission line 300a in cooperation with the optical transmitter side. Thus, the dispersion compensation of each of the wavelengths can be performed in accordance with the thus automatically identified optical fiber type.

FIGS. 15A and 15B are graphs illustrating the concept of the dispersion slope.

The graph G1 of FIG. 15A illustrates an overview of a relationship between the light wavelength and the light power obtained when a plurality of lights of different wavelengths are transmitted through one optical fiber according to a wavelength multiplexing technique. A horizontal axis 81 and a vertical axis 91 represent the light wavelength and the light power intensity, respectively. A curve 14 indicates a light spectrum of n number of different wavelengths from $\lambda 1$ to $\lambda n$.

In the graph G2 of FIG. 15B, the horizontal axis 81 (i.e., the axis representing the light wavelength) uses the scale used in the graph G1, and a vertical axis 92 represents the dispersion value of an optical fiber. A straight line 15 represents dispersion values of the respective wavelengths $\lambda 1$ to $\lambda n$. A dispersion value d1 of the wavelength $\lambda 1$ and a dispersion value dn of the wavelength $\lambda n$ are typically indicated in the graph G2. The slope of the straight line 15 which represents the dispersion values of the respective wavelengths, i.e., the slope of the dispersion values with respect to the wavelengths is the dispersion slope. The dispersion slope is determined by the optical fiber type. Therefore, if the information of the optical fiber types, the dispersion slopes corresponding to the respective optical fiber types, and the dispersion values of the reference wavelengths among the wavelengths to be used are stored, the dispersion value of each of currently used wavelengths can be obtained upon receipt of the optical fiber type information.

In the embodiments of the present invention described above, the configurations of the optical transmitter and the optical receiver embodying the present invention are merely examples. Therefore, the configurations of the optical transmitter and the optical receiver can be modified into a variety of other embodiments. The method of the embodiment of the present invention illustrated in FIG. 4 can be also applied to the thus modified variety of other embodiments.

Further, DSF, NZ-DSF, and SSMF are used in the above embodiments as typical examples of the optical fiber types forming the optical transmission line. The method of the embodiment of the present invention can be also applied to other optical fiber types.

What is claimed is:

1. A method of adjusting light power of light incident on an optical transmission line, comprising:
   measuring light power of reflected light returned from the optical transmission line with respect to light incident on the optical transmission line at first light power;
   measuring light power of reflected light returned from the optical transmission line with respect to light incident on the optical transmission line at second light power, the second light power being larger than the first light power at a predetermined increment;
   calculating a first difference between the measured values of light power of the reflected light corresponding to the light incident on the optical transmission line at the first light power and at the second light power;
   determining a light power threshold to be the first light power with which an amount of change of the first difference reaches a predetermined value; and
   setting light power of light incident on the optical transmission line at a value equal to or smaller than the light power threshold.

2. The method of claim 1, further comprising:
   changing the predetermined increment on the basis of a measured value of light power of reflected light returned from the optical transmission line.

3. The method of claim 1, further comprising:
   measuring light power of reflected light returned from the optical transmission line with respect to light incident on the optical transmission line at third light power, the third light power being larger than the second light power at a predetermined increment;
   calculating a second difference between the measured values of light power of the reflected light corresponding to the light incident on the optical transmission line at the first light power and at the third light power;
   determining a light power threshold to be the first light power with which an amount of change of the calculated first difference and an amount of change of the calculated second difference reach the predetermined value.

4. The method of claim 1, further comprising:
applying a frequency modulation to light incident on the optical transmission line; and
adjusting the light power threshold by changing a frequency of the frequency modulation to be applied.

5. The method of claim 4, further comprising:
transmitting light from an optical transmitter side to an optical receiver side through the optical transmission line;
detecting light power of light received at the optical receiver side;
transmitting notification information from the optical receiver side to the optical transmitter side when the light power detected at the optical receiver side is lower than a specified value;
increasing the light power threshold by applying the frequency modulation to light incident on the optical transmission line at the optical transmitter side; and
increasing light power of light incident on the optical transmission line up to a value equal to or less than the light power threshold increased.

6. The method of claim 4, further comprising:
transmitting light from an optical transmitter side to an optical receiver side through the optical transmission line;
detecting light power of light received at the optical receiver side;
transmitting light power information from the optical receiver side to the optical transmitter side, the light power information indicating a insufficient amount of light power with respect to a specified value; and
setting a light power of light incident on the optical transmission line, at a value equal to or less than the light power threshold and at the value obtained by adding the insufficient amount of light power to light power of light currently incident on the optical transmission line.

7. The method of claim 1, further comprising:
storing tolerance range information including a tolerance range of a light power threshold associated with each of plural optical fiber types;
comparing the light power threshold with each of tolerance ranges included in the tolerance range information; and
identifying the optical fiber type associated with the tolerance range including the light power threshold as the actual optical fiber type of the optical transmission line.

8. The method of claim 7, further comprising:
transmitting the actual optical fiber type from an optical transmitter side to an optical receiver side; and
performing dispersion compensation to each of a wavelength of signal light received from the optical transmission line at the optical receiver side on the basis of the actual optical fiber type.

9. An optical transmitter for transmitting light, comprising:
means for setting light power of light incident on an optical transmission line;
means for generating light incident on the optical transmission line at first light power;
means for generating light incident on the optical transmission line at second light power, the second light power being larger than the first light power at a predetermined increment;
means for measuring light power of reflected light returned from the optical transmission line with respect to light incident on the optical transmission line;
means for calculating a first difference between the measured values of light power of the reflected light corresponding to the light incident on the optical transmission line at the first light power and at the second light power;
means for determining a light power threshold to be the first light power with which an amount of change of the first difference reaches a predetermined value; and
means for setting light power of light incident on the optical transmission line at a value equal to or smaller than the light power threshold.

10. The optical transmitter of claim 9, further comprising:
means for changing the predetermined increment on the basis of a measured value of light power of reflected light returned from the optical transmission line.

11. The apparatus of claim 9, further comprising:
means for generating light incident on the optical transmission line at third light power, the third light power being larger than the second light power at a predetermined increment;
means for calculating a second difference between the measured values of light power of the reflected light corresponding to the light incident on the optical transmission line at the first light power and at the third light power;
means for determining the light power threshold to be the first value with which an amount of change of the first difference and an amount of change of the second difference reach the predetermined difference value.

12. The optical transmitter of claim 9, further comprising:
means for applying a frequency modulation to light incident on the optical transmission line; and
means for adjusting the light power threshold by changing a frequency of the frequency modulation to be applied.

13. The optical transmitter of claim 12, further comprising:
means for transmitting light from an optical transmitter side to an optical receiver side through the optical transmission line;
means for receiving notification information transmitted from the optical receiver side, the notification information indicating that light power detected at the optical receiver side is lower than a specified value;
means for increasing the light power threshold by applying the frequency modulation to light incident on the optical transmission line; and
means for increasing light power of light incident on the optical transmission line up to a value equal to or less than the light power threshold increased.

14. The optical transmitter of claim 12, further comprising:
means for transmitting light from an optical transmitter side to an optical receiver side through the optical transmission line;
means for receiving light power information from the optical receiver side, the light power information indicating a insufficient amount of light power of light received at the optical receiver side with respect to a specified value;
means for setting a light power of light incident on the optical transmission line, at a value equal to or less than the light power threshold and at the value obtained by adding the insufficient amount of light power to light power of light currently incident on the optical transmission line.

15. The optical transmitter of claim 9, further comprising:

means for storing tolerance range information including a tolerance range of a light power threshold associated with each of optical fiber types;

means for comparing the light power threshold with each of tolerance ranges included in the tolerance range information;

means for identifying the optical fiber type associated with the tolerance range including the light power threshold as a actual optical fiber type of the optical transmission line; and means for sending the actual optical fiber type to the optical receiver side through the optical transmission line.

\* \* \* \* \*

UNITED STATES PATENT AND TRADEMARK OFFICE
CERTIFICATE OF CORRECTION

| | |
|---|---|
| PATENT NO. | : 7,324,189 B2 |
| APPLICATION NO. | : 11/277559 |
| DATED | : January 29, 2008 |
| INVENTOR(S) | : Toshihiro Ohtani |

It is certified that error appears in the above-identified patent and that said Letters Patent is hereby corrected as shown below:

Title Page, Column 2 (Abstract), Line 1, before "a" delete "provide".

Column 21, Line 30, change "a" to --an--.

Column 22, Line 60, change "a" to --an--.

Column 24, Line 3, change "a" to --an--.

Signed and Sealed this

Fifteenth Day of July, 2008

JON W. DUDAS
*Director of the United States Patent and Trademark Office*